US007324514B1

(12) United States Patent
Haq et al.

(10) Patent No.: US 7,324,514 B1
(45) Date of Patent: Jan. 29, 2008

(54) IMPLEMENTING ACCESS CONTROL LISTS USING A BALANCED HASH TABLE OF ACCESS CONTROL LIST BINARY COMPARISON TREES

(75) Inventors: Faisal Haq, Sunnyvale, CA (US); Hari K. Lalgudi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 09/483,110

(22) Filed: Jan. 14, 2000

(51) Int. Cl.
*H04L 12/28* (2006.01)

(52) U.S. Cl. .................................. 370/392; 370/395.32

(58) Field of Classification Search ........ 370/229–235, 370/401, 412, 389–399, 351; 709/220, 221, 709/222, 227, 228, 229; 711/3, 108, 156, 711/205, 206
See application file for complete search history.

(56) References Cited

U.S. PATENT DOCUMENTS

| 5,243,538 | A | * | 9/1993 | Okuzawa et al. ............... 716/5 |
| 5,390,173 | A | * | 2/1995 | Spinney et al. ............. 370/393 |
| 5,509,006 | A | * | 4/1996 | Wilford et al. ............. 370/401 |
| 5,509,123 | A | * | 4/1996 | Dobbins et al. ............ 709/243 |
| 5,748,486 | A | * | 5/1998 | Ashar et al. .................... 716/18 |
| 5,893,086 | A | * | 4/1999 | Schmuck et al. ............... 707/1 |
| 6,223,172 | B1 | * | 4/2001 | Hunter et al. ................... 707/3 |
| 6,341,130 | B1 | * | 1/2002 | Lakshman et al. .......... 370/389 |
| 6,343,072 | B1 | * | 1/2002 | Bechtolsheim et al. ..... 370/351 |
| 6,377,577 | B1 | * | 4/2002 | Bechtolsheim et al. ..... 370/392 |
| 6,453,419 | B1 | | 9/2002 | Flint et al. .................. 713/201 |
| 6,515,963 | B1 | * | 2/2003 | Bechtolsheim et al. ..... 370/229 |
| 6,516,320 | B1 | * | 2/2003 | Odom et al. ................. 707/101 |
| 6,580,712 | B1 | * | 6/2003 | Jennings et al. ............ 370/392 |
| 6,651,096 | B1 | * | 11/2003 | Gai et al. .................... 709/223 |
| 6,922,410 | B1 | * | 7/2005 | O'Connell ................... 370/401 |

OTHER PUBLICATIONS

Alessandri, Access Control List Processing in Hardware, Diploma Thesis, pp. 1-85, Oct. 1997.*
Waldvogel et al, Scalable High Speed IP Routing Lookups, ACM, pp. 25-36, 1997.*

(Continued)

*Primary Examiner*—Frank Duong
(74) *Attorney, Agent, or Firm*—Campbell Stephenson LLP

(57) ABSTRACT

A method and system for implementing Access Control Lists (ACLs) using a Balanced Hash Table of ACL Binary Comparison Trees (ABCTs), where the Balanced Hash Table of ABCTs encodes the replaced ACL. In one embodiment, the method includes but is not limited to receiving at least one packet, and disposing of the received at least one packet in response to a walk of a Balanced Hash Table of ABCTs, where the Balanced Hash Table of ABCTs encodes an Access Control List. In another embodiment, the method further includes converting the Access Control List to the Balanced Hash Table of ABCTs, the Balanced Hash Table of ABCTs encoding the Access Control List. In one embodiment, the system receives at least one packet, and disposing disposes of the received at least one packet in response to a walk of a Balanced Hash Table of ABCTs, where the Balanced Hash Table of ABCTs encodes an Access Control List. In another embodiment, the system further includes converts the Access Control List to the Balanced Hash Table of ABCTs, where the Balanced Hash Table of ABCTs encodes the Access Control List.

63 Claims, 33 Drawing Sheets

OTHER PUBLICATIONS

Varghese et al, Trading Packet Headers for Packet Processing, IEEE, pp. 141-152, Apr. 1996.*
Held, Working with Cisco Access Lists, International Journal of Network Management, pp. 151-154, 1999.*
Hazelhurst et al, Binary Decision Diagram Representation of Firewall and Router Access Lists, CiteSeer, pp. 1-11, 1998.*
Bryant, Symbolic Boolean Manipulation with Ordered Binary Decision Diagrams, CiteSeer, pp. 1-34, 1992.*

* cited by examiner

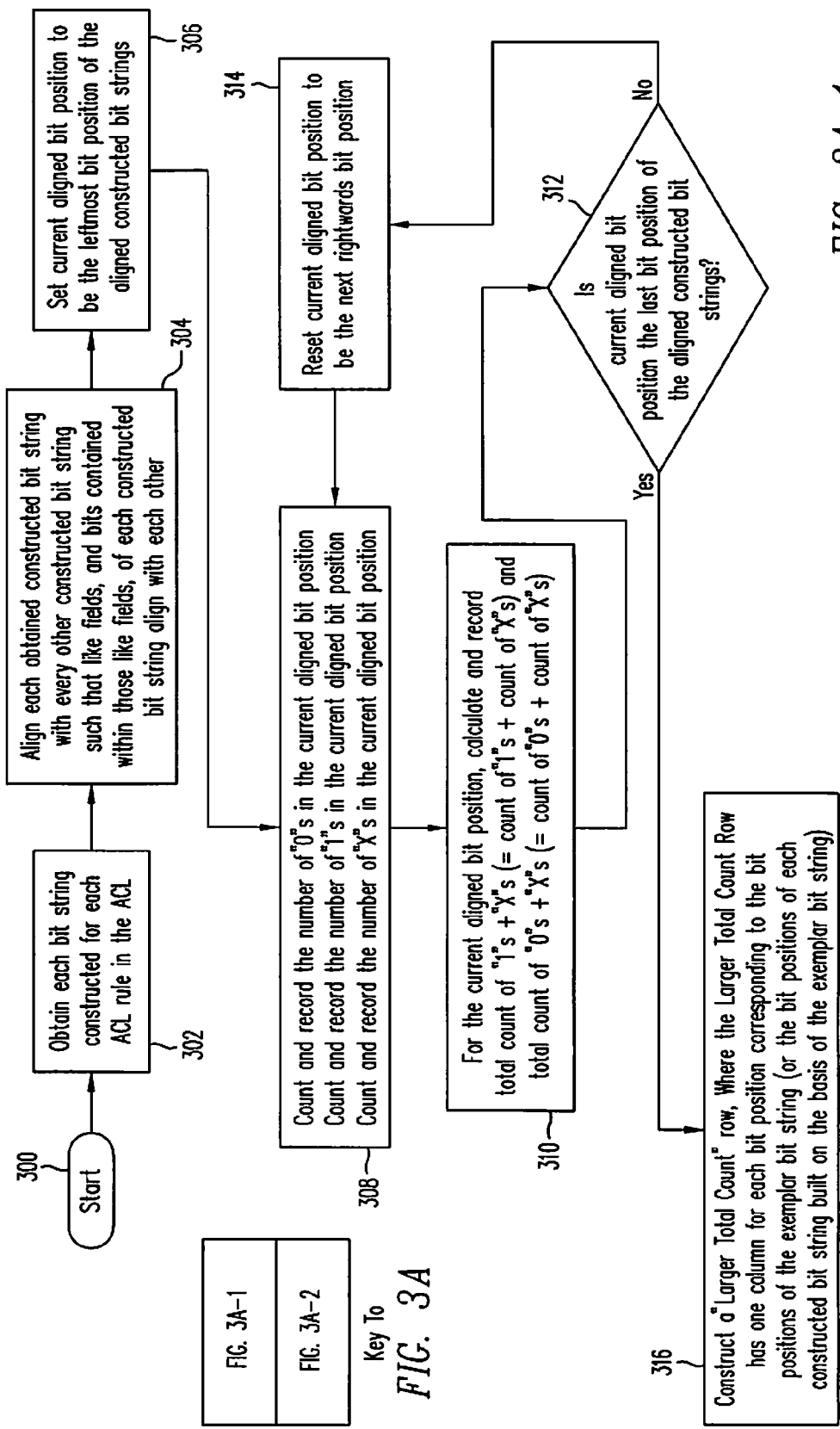

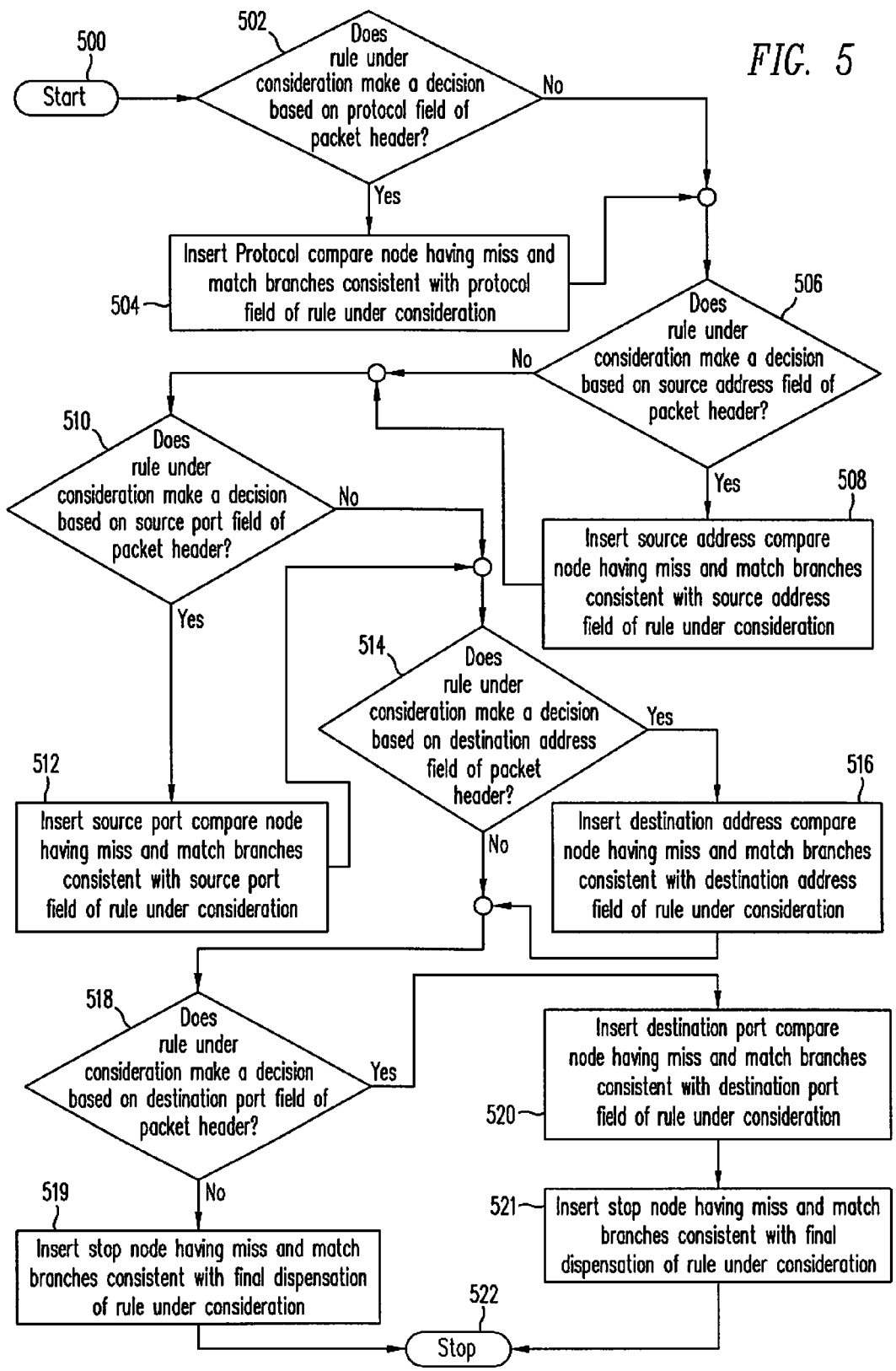

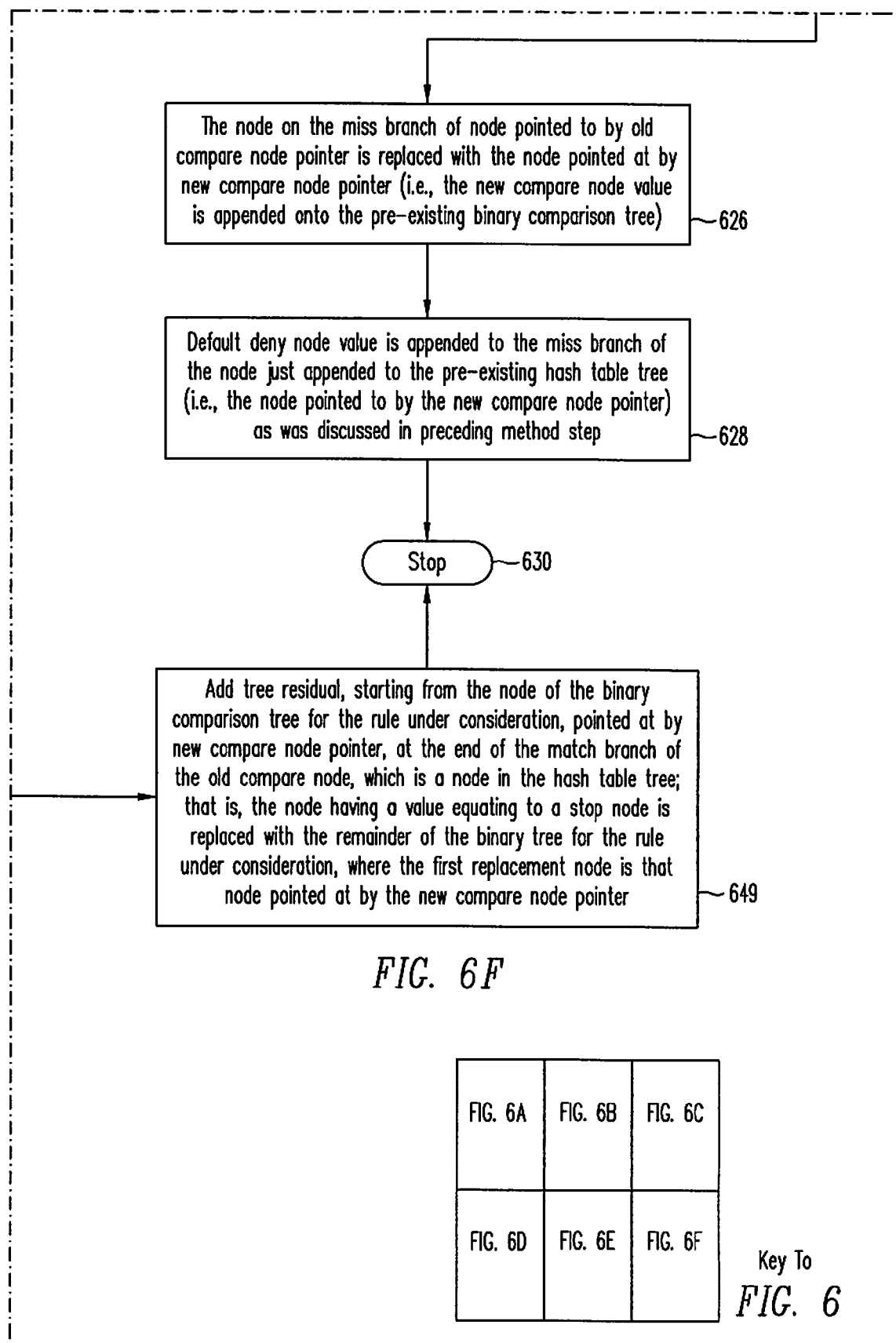

| Simplified Example of Ordered ACL Rule Set Typically Entered by a Network Administrator expressed as plain english statements | Examples of Coded Versions of ACL Rules Which Are Typically Utilized Within an ACL Rule Set |
|---|---|
| Permit TCP protocol packets from any source IP address going to host having an IP address of 28.16.31.10 and a port identifier equal to 28. | PERMIT TCP ANY HOST 28.16.31.10 EQ 28 |
| Deny TCP protocol packets from any source IP address going to host having an IP address of 28.16.31.10 and a port identifier greater than 23. | DENY TCP ANY HOST 28.16.31.10 GT 23 |
| Deny UDP protocol packets from any source IP address going to host having an IP address of 30.22.12.5 and a port identifier equal to 11. | DENY UDP ANY HOST 30.22.21.5 EQ 11 |
| Permit UDP protocol packets from any source IP address going to host having an IP address of 30.22.12.X, where X indicates any number, or "don't care." | PERMIT UDP ANY HOST 30.22.21.X |
| Deny all packets having source IP address of 23.20.7.0 and any destination address (indicated by address X.X.X.X, where X indicates any number, or "don't care"). | DENY TCP 23.20.7.0 X.X.X.X. |
| Permit TCP protocol packets from any source IP address going to host having an IP address of 28.16.32.10. | PERMIT TCP ANY HOST 28.16.31.10 |

FIG. 7A

Example of the Creation of an Exemplar Bit String Having One Field for Each Packet Header Field Utilized by at Least One ACL Rule in the ACL Rule Set, and the Subsequent Creation of Bit Strings for each ACL Rule in the ACL Rule Set Based on the Created Exemplar

| Construct Exemplar Bit String Based On Packet Header Fields Utilized by ACL Rule Set Rules | Protocol ID | Source Address | Destination Address | Destination Port |
|---|---|---|---|---|
| Bit String, based on exemplar, for ACL Rule 1 with string "01001" associated with TCP protocol for sake of example. | 01001.XXXXX.XXXXX.XXXXX.11100.10000.11111.01010.10111 | | | |
| Bit String, based on exemplar, for ACL Rule 2 with string "01001" associated with TCP protocol for sake of example. | 01001.XXXXX.XXXXX.XXXXX.11100.10000.11111.01010.11100 | | | |
| Bit String, based on exemplar, for ACL Rule 3 with string "11111" associated with UDP protocol for sake of example. | 11111.XXXXX.XXXXX.XXXXX.11110.10110.10101.00101.01011 | | | |
| Bit String, based on exemplar, for ACL Rule 4 with string "11111" associated with UDP protocol for sake of example. | 11111.XXXXX.XXXXX.XXXXX.11110.10110.10101.XXXXX.XXXXX | | | |
| Bit String, based on exemplar, for ACL Rule 5 with string "01001" associated with TCP protocol for sake of example. | 01001.10111.10101.00111.00000.XXXXX.XXXXX.XXXXX.XXXXX | | | |
| Bit String, based on exemplar, for ACL Rule 6 with string "01001" associated with TCP protocol for sake of example. | 01001.XXXXX.XXXXX.XXXXX.11100.10000.11111.01010.XXXXX | | | |
| Note: "Bit Position" is illustrated for sake of clarity and ease of counting herein as taking account of the periods between 5 bit fields; however, those skilled in the art will recognize that ordinarily such periods are not counted as bit positions. | 000000000111111111122222222223333333333444444444455555555555 → Read Bit Position<br>12345678901234567890123456789012345678901234567890123456789 → Slot Numbers Vertically.<br><br>For example, the first bit position is denoted 0<br>1, the second, 2, the third, 3, the fourth, 4,<br>the eleventh, 1, and the fifty-ninth, 9. | | | |

FIG. 7B

Example of the Creation of a Bit Selection Vector

| | |
|---|---|
| "0" Count in Each Bit Position:<br>"X" Count in Each Bit Position: | 40440.01000.01010.11000.11111.00035.05335.02020.41313.11111<br>00000.55555.55555.55555.55555.11111.11111.11111.22222.33333 |
| Total of "0" + "X" Counts: | 40440.56555.56565.66555.66666.11146.16446.13131.63535.44444 |
| "1" Count in Each Bit Position:<br>"X" Count in Each Bit Position: | 26226.10111.10101.00111.00000.55520.50220.53535.03131.22222<br>00000.55555.55555.55555.55555.11111.11111.11111.22222.33333 |
| Total of "1" + "X" Counts: | 26226.65666.55666.55555.66631.61331.64645.25353.55555 |
| Construct a "Larger Total Count" row having one row entry corresponding to each bit position in the strings which were constructed from the ACL rules; fill each row entry with the larger of either the "Total of '0' + 'X' Counts" or "Total of '1' + 'X' Counts" for the bit position corresponding to that row entry. | 46446.66666.66666.66666.66666.55555.66646.64645.65555.55555 |
| Construct a "Smaller Total Count" row having one row entry corresponding to each bit position in the strings which were constructed from the ACL rules; fill each row entry with the smaller of either the "Total of '0' + 'X' Counts" or "Total of '1' + 'X' Counts" for the bit position corresponding to that row entry. | 20226.55555.55555.55555.55555.11131.11331.13131.23333.44444 |
| Set number of unspecified pointers of bit selection vector = specified bit length of hash table index | Number of Unspecified Pointers of Bit Selection Vector = 4 For sake of example, assume hash table index having a bit length of 4 is specified. |
| Select the row entries in the "Larger Total Count" Row columns having the smallest number entries; designate the bit positions corresponding to the selected row columns as potential, "P," candidate columns which might be utilized as the pointers of the bit selection vector | P PP    P PP   P P<br>Note: The row columns 1, 3, 34, 39, 41, and 46 of the "Larger Total Count" row had the smallest entries (i.e., the base 10 number "4"), and thus the bit positions associated with row columns 1, 3, 34, 39, 41, and 46 of the "Larger Total Count" row are designated as potential candidate bits "P." |
| Since there are more potential, "P," candidate columns than number of unspecified pointers of bit selection vector, refine the selection by examining the columns of the Smaller Total | R RR<br>Note: The row columns 1, 3, and 4 of the "Smaller Total Count" row, corresponding with the selected row columns of the "Larger Total Count" row, had the smallest entries (i.e., the base 10 number "2"), and thus the bit positions associated with row columns 1, 3, and 4 of the "Smaller Total Count" row are redesignated as |

*FIG. 7C1*

| | |
|---|---|
| Count Row, with such examined Smaller Total Count Row columns being those corresponding to the Larger Total Count Row columns designated as potential, "P," candidate columns; redesignate as potential, "R," candidate columns which might be utilized as the pointers of the bit selection vector, those examined Smaller Total Count Row columns with the smallest number entries | candidate bits "R". |
| Since the number or redesignated potential candidates, "R," is less than the number of unspecified pointers of bit selection vector, designate all redesignated, "R," candidates as actual, "K," bit selection vector Pointer Indication Columns, whose corresponding bit positions in the respective fields from which the respective bit strings were constructed will thereafter be pointed at by pointers of the bit selection vector | K KK<br><br>Note: The number of unspecified pointers of bit selection vector is currently equal to 4, and the number of redesignated potential candidates, "R," is 3, which is less than the number of unspecified pointers of bit selection vector; thus, all "R" potential candidates are specified actual, "K," bit selection vector pointer indication columns, whose corresponding bit positions in the respective fields from which the respective bit strings were constructed will thereafter be pointed at by pointers of the bit selection vector. |
| Substract the number of specified actual, "K," bit selection vector pointer indication columns, whose corresponding bit positions in the respective fields from which the respective bit strings were constructed will thereafter be pointed at by pointers of the bit selection vector, from number of unspecified pointers of bit selection vector | Number of unspecified pointers of bit selection vector =<br>number of unspecified pointers of bit selection vector (i.e., 4) –<br>number of specified actual, "K," bit selection vector pointer indication columns, whose corresponding bit positions in the respective fields from which the respective bit strings were constructed will thereafter be pointed at by pointers of the bit selection vector specified in preceding step (i.e., 3)<br>= 1 pointer left unspecified |
| Since the number of unspecified pointers of bit selection vector is still non-zero, mark specified "K," bit selection vector pointer indication columns, whose corresponding bit positions in the respective fields from which the respective bit strings were constructed will thereafter be pointed at by | * *<br><br>Note: Row columns 1, 3, and 4 are marked with asterisks to indicate that since these row columns have already been designated as candidates "K," bit selection vector pointer indication columns, whose corresponding bit positions in the respective fields from which the respective bit strings were constructed will thereafter be pointed at by pointers of the bit selection vector. |

FIG. 7C2

| | |
|---|---|
| pointers of the bit selection vector with asterisks indicating that such columns are no longer selectable or under consideration, since the bit positions associated with the "K," bit selection vector pointer indication columns, whose corresponding bit positions in the respective bit strings from which the respective bit strings were constructed will thereafter be pointed at by pointers of the bit selection vector have already been specified | |
| Thereafter, repeat the "select the row entries in the Larger Total Count" Row having smallest number entries . . ." operation above upon the row columns which have not yet been designated as candidate "K," bit selection vector pointer indication columns, whose corresponding bit positions in the respective fields from which the respective bit strings were constructed will thereafter be pointed at by pointers of the bit selection vector | \* \*\*     P    PP   P P<br><br>Note: Row columns 1, 3, and 4 are marked with asterisks to indicate that since the bit positions associated with these row columns have already been designated as candidates. |

*FIG. 7C3*

| | |
|---|---|
| Since there are more candidates, "P," than number of unspecified pointers of bit selection vector (at this point, 3 pointers have been specified as "K," meaning that one additional pointer is necessary to have the pointers required to completely point out the 4 bit hash table index), repeat the refine the selection operation above | R  RR  R R<br><br>Note: Since all entries in the "Smaller Total Count" Row columns, corresponding with the selected row columns of the "Larger Total Count" Row, were the same number (i.e., the base ten number "3"), all P row columns are redesignated as candidates "R". |
| Since after redesignation there are still more candidates "R" than the number of unspecified pointers of bit selection vector, all "R," candidates are deemed equally good choices; consequentially, the number of actual, "K," bit selection vector pointer indication columns, whose corresponding bit positions in the respective fields from which the respective bit strings were constructed will thereafter be pointed at by pointers of the bit selection vector necessary to completely point out the hash table index value (i.e., in the present example, one more pointer is needed) may be selected at random from the designated "R" row columns. | K<br><br>Note: Select row column 34 at random. |
| There are now specified actual, "K," bit selection vector pointer indication columns, whose corresponding bit positions in the respective fields from which the respective bit strings were constructed will thereafter be pointed at by pointers of the bit selection vector equal in number to the bit length of the hash table index; consequently, all pointers of the bit selection vector, which will be utilized to point to bit positions used to form a hash table index value which will be used to "key into" | K KK<br><br>Note: These actual, "K," bit selection vector pointer indication columns, whose corresponding bit positions in the respective fields from which the respective bit strings were constructed will thereafter be pointed at by pointers of the bit selection vector indicate that the first, third, and fourth leftmost bit positions within the "protocol ID" field, and the fourth leftmost bit positions within the "destination address" field will be utilized as the hash table index bits. |

FIG. 7C4

| | |
|---|---|
| the hash table, have been fully specified. | |
| Definition of the bit selection vector | Bit Selection Vector = <br> (pointer to first leftmost bit position within the "protocol ID" field; <br> pointer to third leftmost bit position within the "protocol ID" field; <br> pointer to fourth leftmost bit position within the "protocol ID" field; <br> pointer to fourth leftmost bit position within the "destination address" field) |

*FIG. 7C5*

Example showing the construction of Balanced Hash Table of ACL Binary Comparison Trees
Example showing the creation of a Binary Comparison Tree for First In Sequence ACL Rule in Rule Set

PERMIT TCP ANY HOST 28.16.31.10 EQ 28

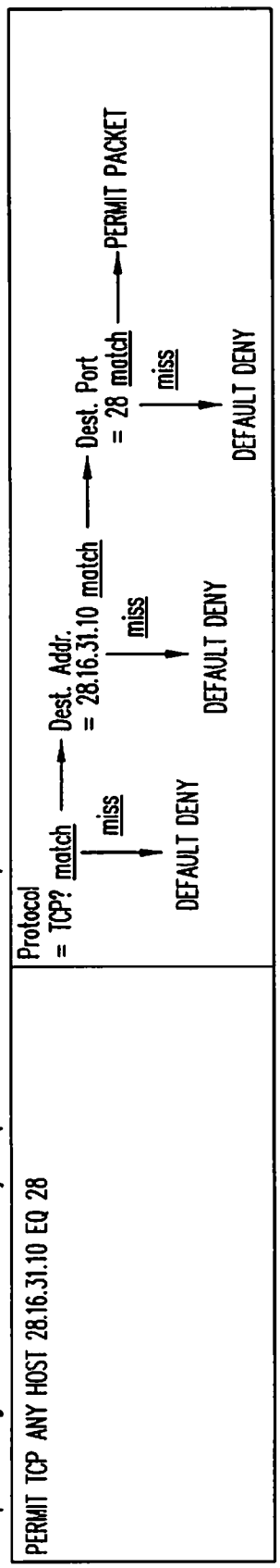

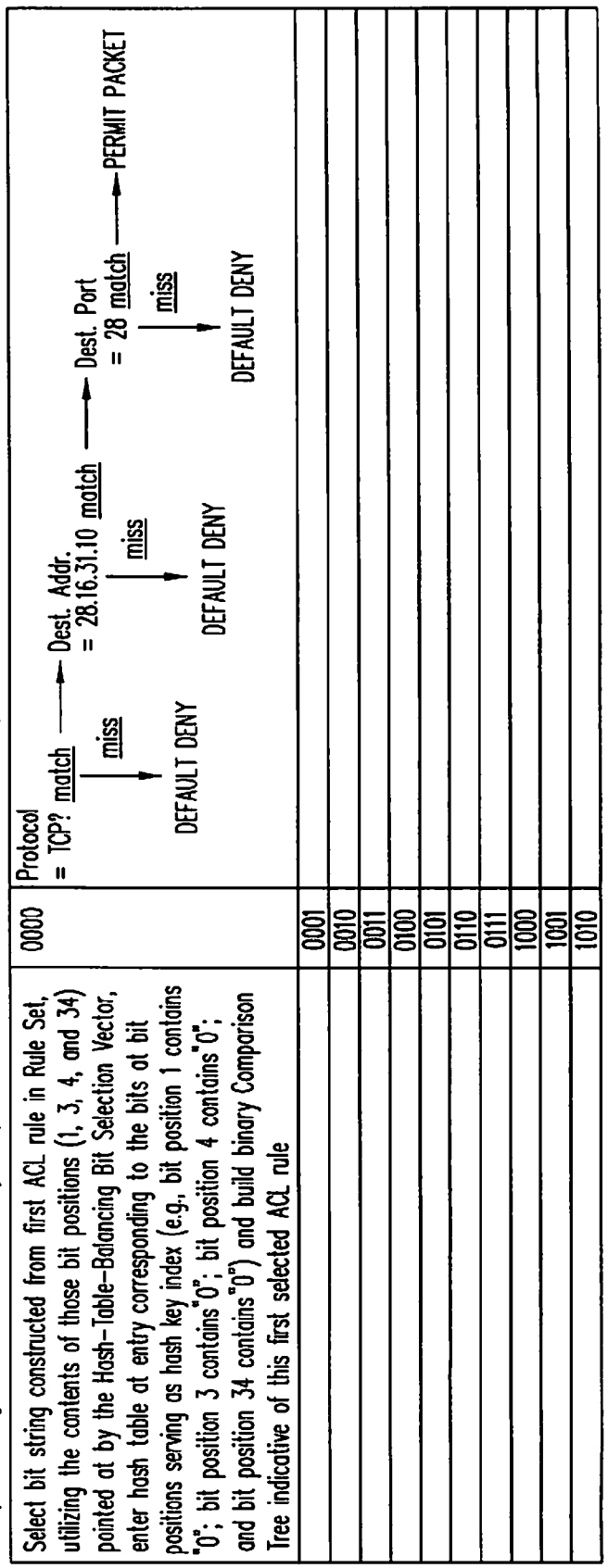

Example showing the addition of a Binary Comparison Tree constructed for the first in Sequence Rule in ACL Rule Set into the Hash Table Select bit string constructed from first ACL rule in Rule Set, utilizing the contents of those bit positions (1, 3, 4, and 34) pointed at by the Hash-Table-Balancing Bit Selection Vector, enter hash table at entry corresponding to the bits at bit positions serving as hash key index (e.g., bit position 1 contains "0"; bit position 3 contains "0"; bit position 4 contains "0"; and bit position 34 contains "0") and build binary Comparison Tree indicative of this first selected ACL rule

Example Showing the Construction of Balanced Hash Table of ACL Binary Comparison Trees (cont.)
Example Showing the Creation of a Binary Comparison Tree for Second In Sequence Rule in Rule Set

DENY TCP ANY HOST 28.16.31.10 GT 23

Protocol = TCP? match → Dest. Addr. = 28.16.31.10 match → Dest. Port > 23 match → DENY PACKET
miss ↓
DEFAULT DENY
miss ↓
DEFAULT DENY Example Showing the Addition of a Binary Comparison Tree Constructed for the Second In Sequence Rule in ACL Rule Set into the Hash Table

| 0000 | Protocol = TCP? match → Dest. Addr. = 28.16.31.10 match → Dest. Port = 28 match → PERMIT PACKET<br>miss ↓ DEFAULT DENY<br>miss ↓ DEFAULT DENY<br>Dest. Port > 23 match → DENY PACKET<br>miss ↓ DEFAULT DENY |
|---|---|
| 0001 | |
| 0010 | |
| 0011 | |
| 0100 | |
| 0101 | |
| 0110 | |
| 0111 | |
| 1000 | |
| 1001 | |

Select bit string constructed from second ACL rule in Rule Set, utilizing the contents of those bit positions (1, 3, 4, and 34) pointed at by the Hash-Table-Balancing Bit Selection Vector, enter hash table at entry corresponding to the bits at bit positions serving as hash key index (e.g., bit position 1 contains "0"; bit position 3 contains "0"; bit position 4 contains "0"; and bit position 34 contains "0") and build binary Comparison Tree indicative of this second selected ACL rule, building on any tree that may already be present for the hash table index.

| 1010 | 1011 | 1100 | 1101 | 1110 | 1111 |

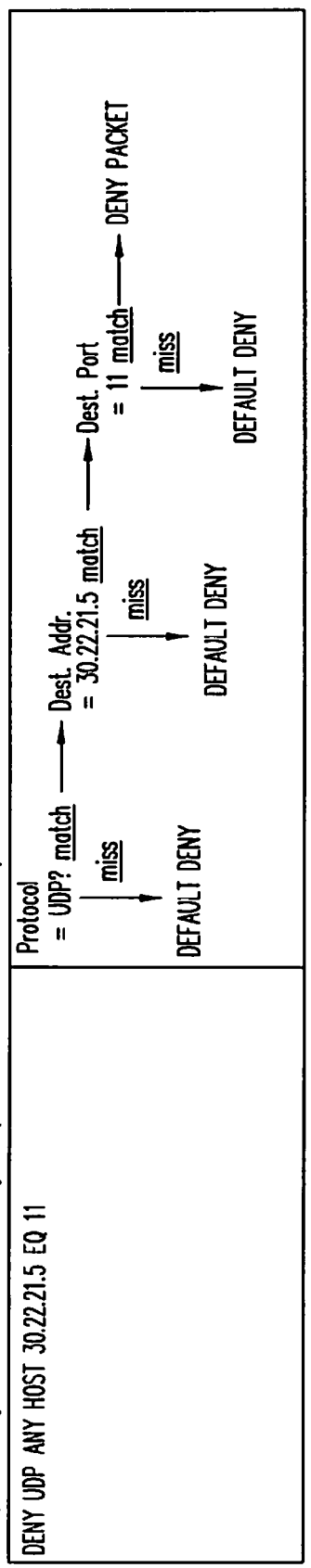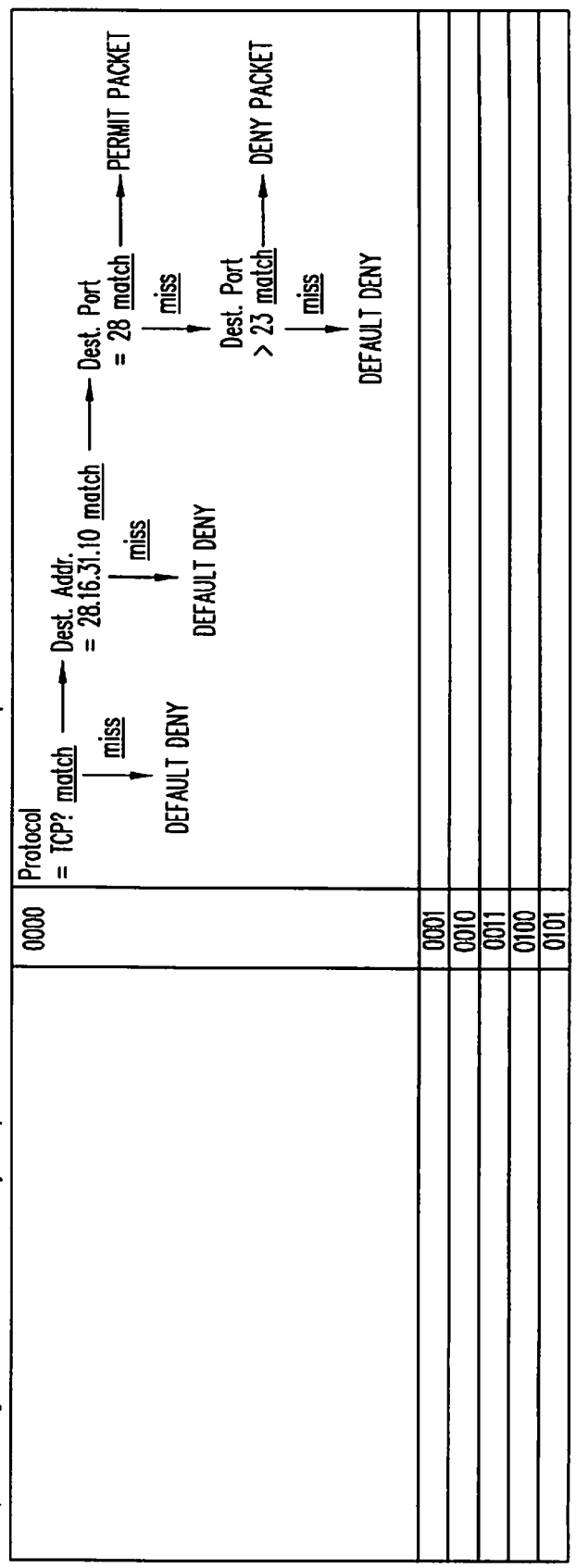
FIG. 7D5

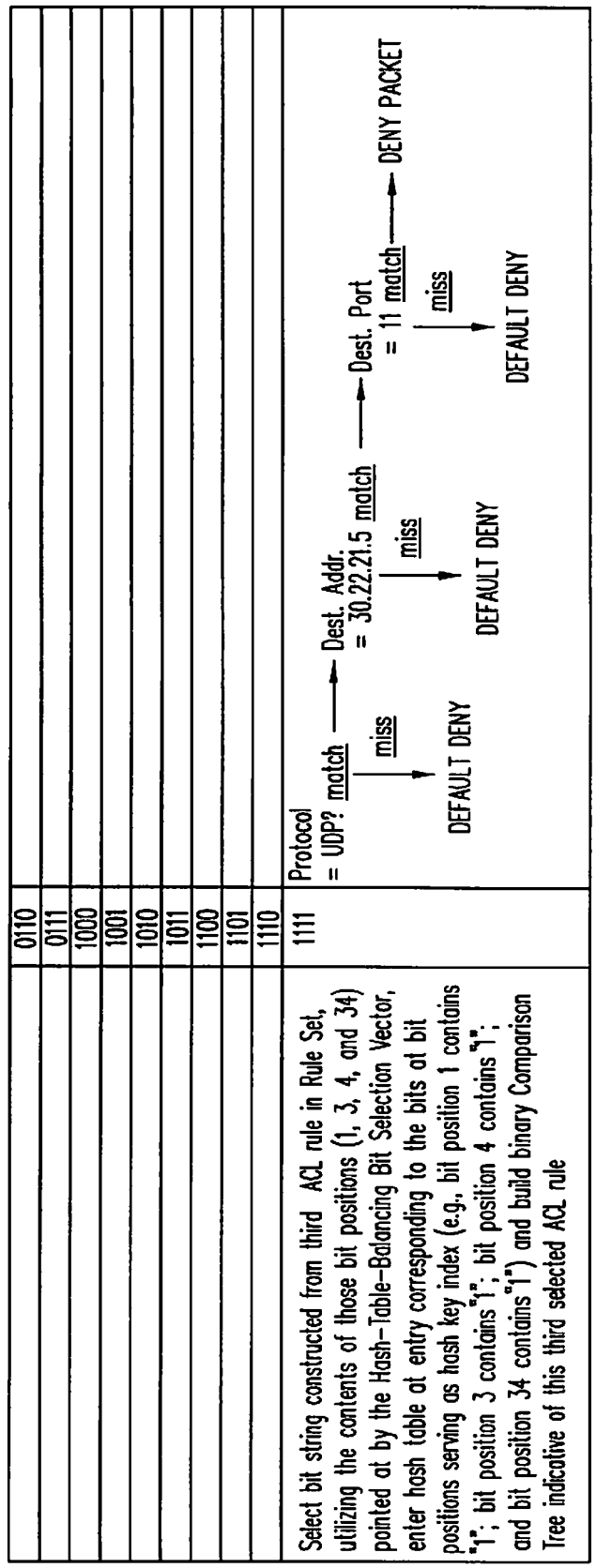
FIG. 7D6

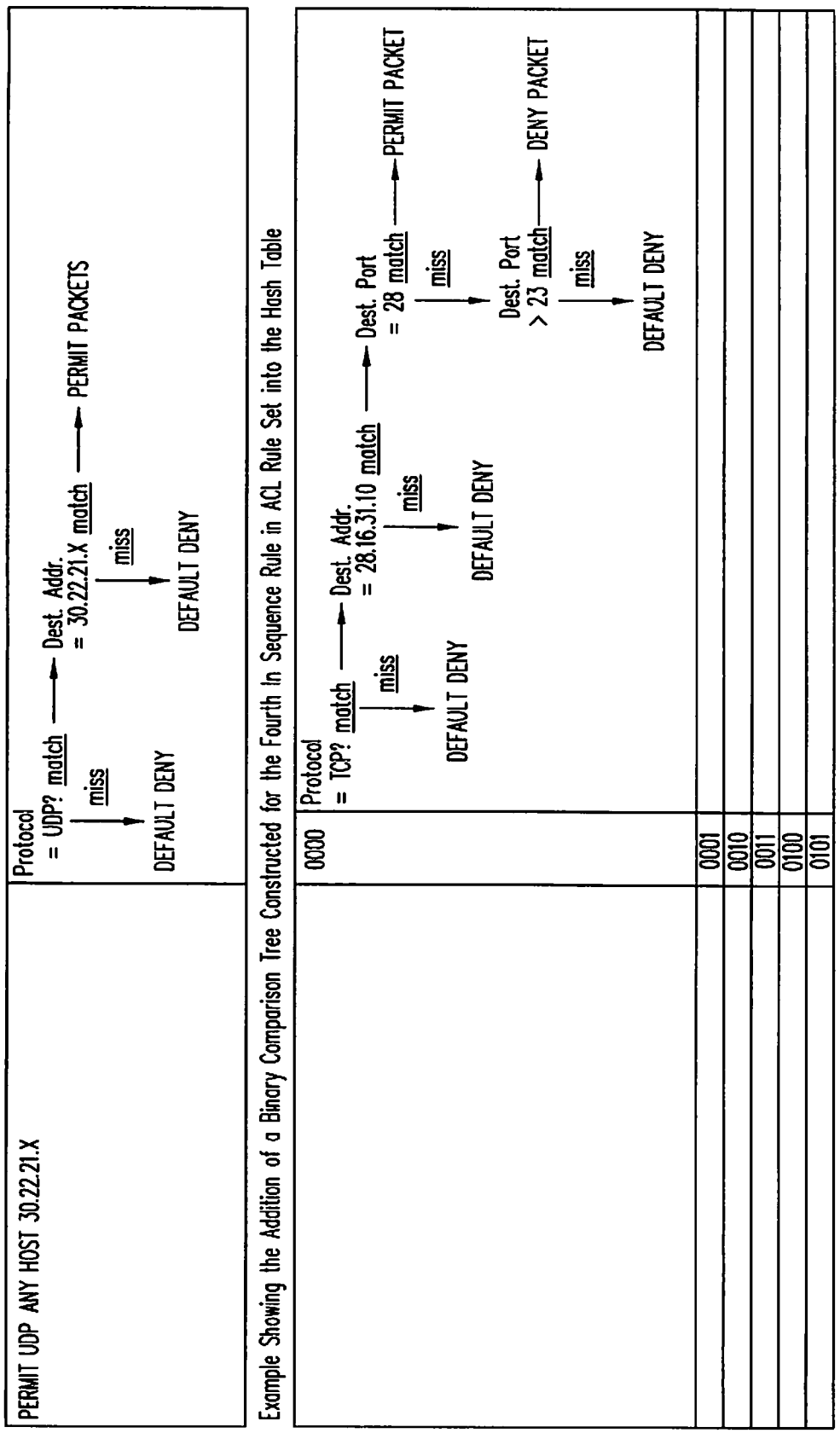
FIG. 7D7

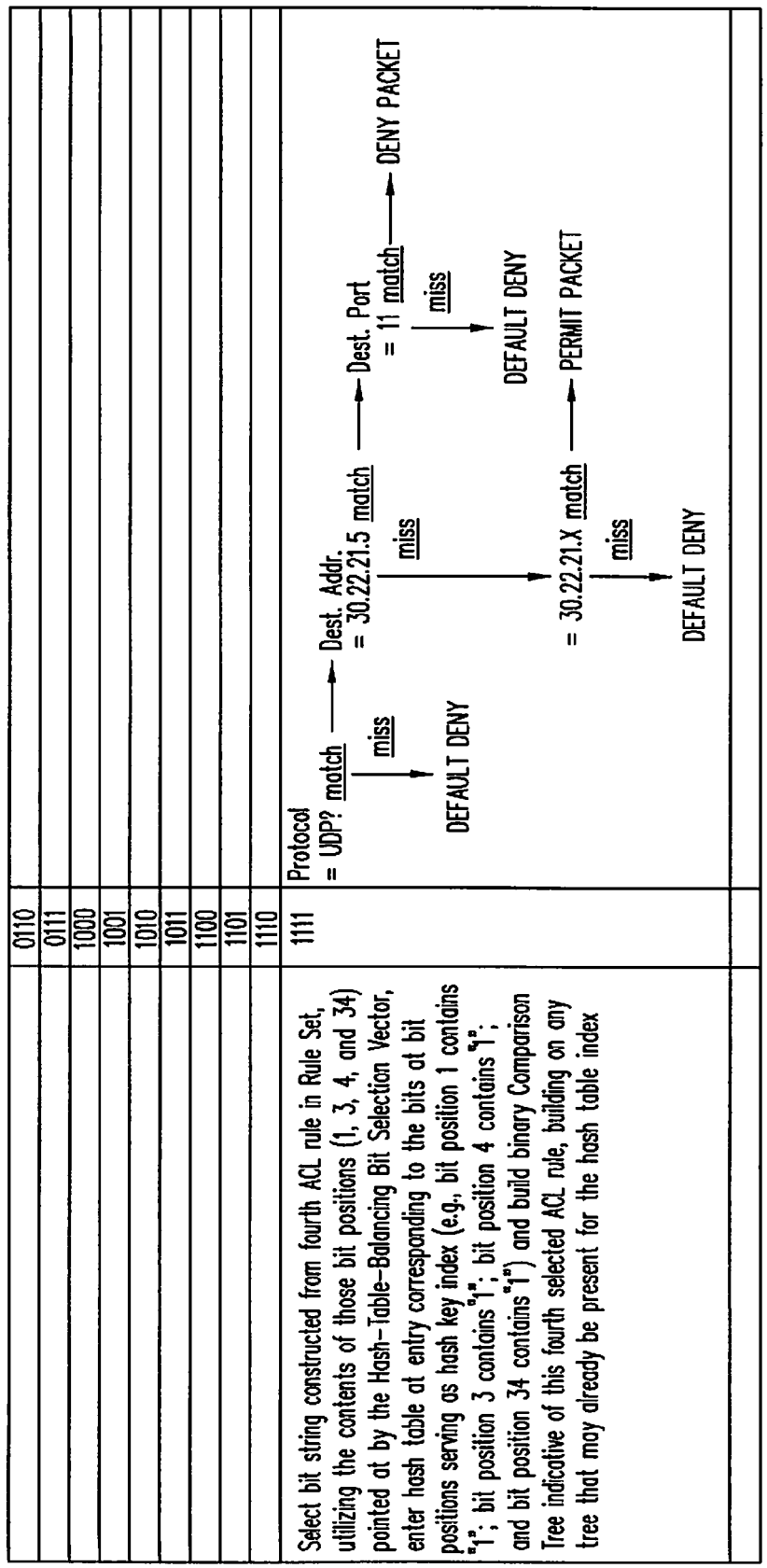
FIG. 7D8

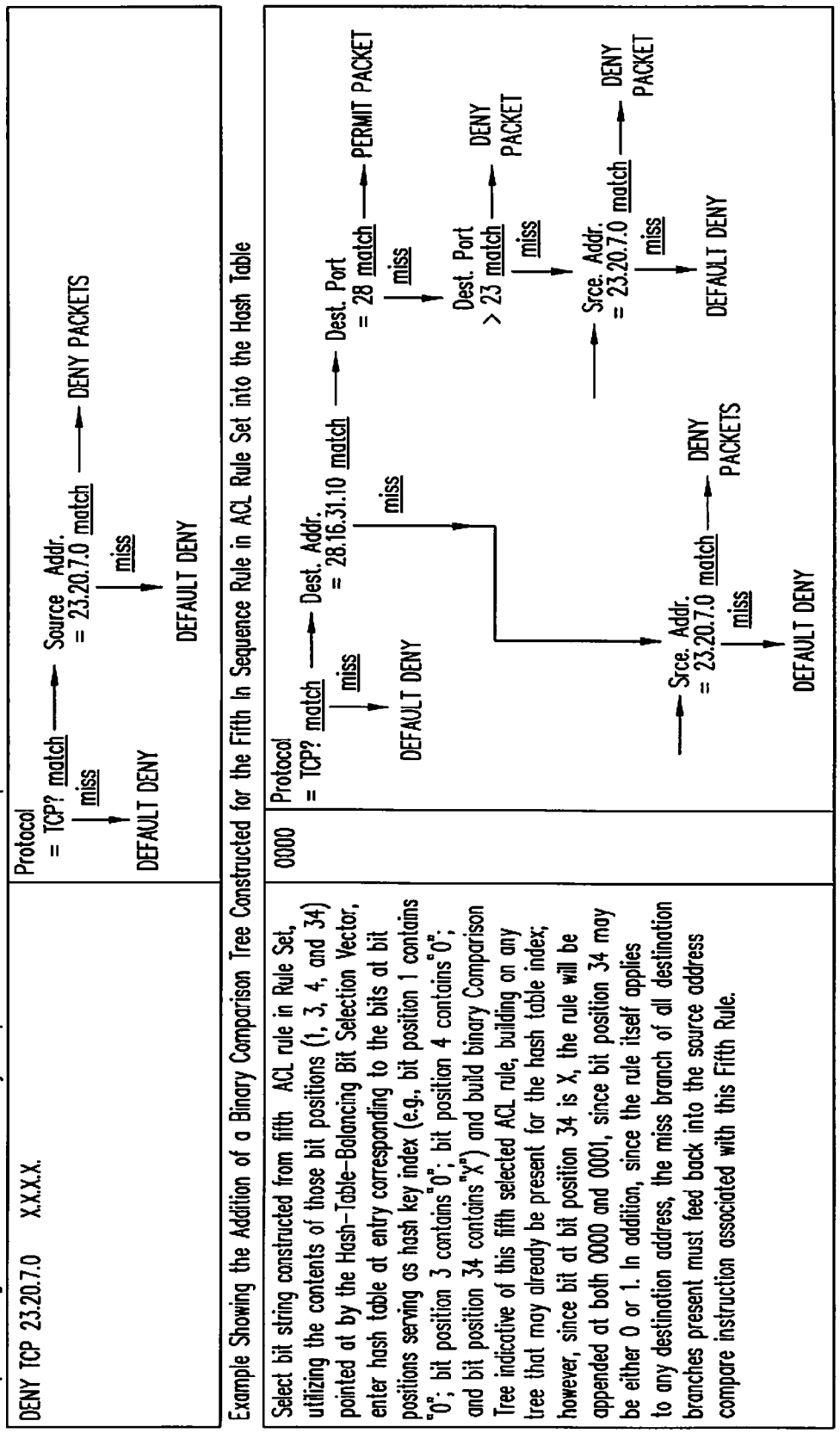
FIG. 7D9

| Select bit string constructed from fifth ACL rule in Rule Set, utilizing the contents of those bit positions (1, 3, 4, and 34) pointed at by the Hash-Table-Balancing Bit Selection Vector, enter hash table at entry corresponding to the bits at bit positions serving as hash key index (e.g., bit position 1 contains "0"; bit position 3 contains "0"; bit position 4 contains "0"; and bit position 34 contains "X") and build binary Comparison Tree indicative of this fifth selected ACL rule, building on any tree that may already be present for the hash table index; however, since bit at bit position 34 is X, the rule will be appended at both 0000 and 0001, since bit position 34 may be either 0 or 1. | 0001 | Protocol = TCP? match ⟶ Source Addr. = 23.20.7.0 match ⟶ DENY PACKETS <br> ↓ miss <br> DEFAULT DENY ⟶ miss ⟶ DEFAULT DENY |
|---|---|---|
| | 0010 | |
| | 0011 | |
| | 0100 | |
| | 0101 | |
| | 0110 | |
| | 0111 | |
| | 1000 | |
| | 1001 | |
| | 1010 | |
| | 1011 | |
| | 1100 | |
| | 1101 | |
| | 1110 | |
| | 1111 | Protocol = UDP? match ⟶ Dest. Addr. = 30.22.21.5 match ⟶ Dest. Port = 11 match ⟶ PERMIT PACKET <br> ↓ miss ↓ miss ↓ miss <br> DEFAULT DENY = 30.22.21.X match ⟶ DENY PACKET <br> ↓ miss <br> DEFAULT DENY |

FIG. 7D10

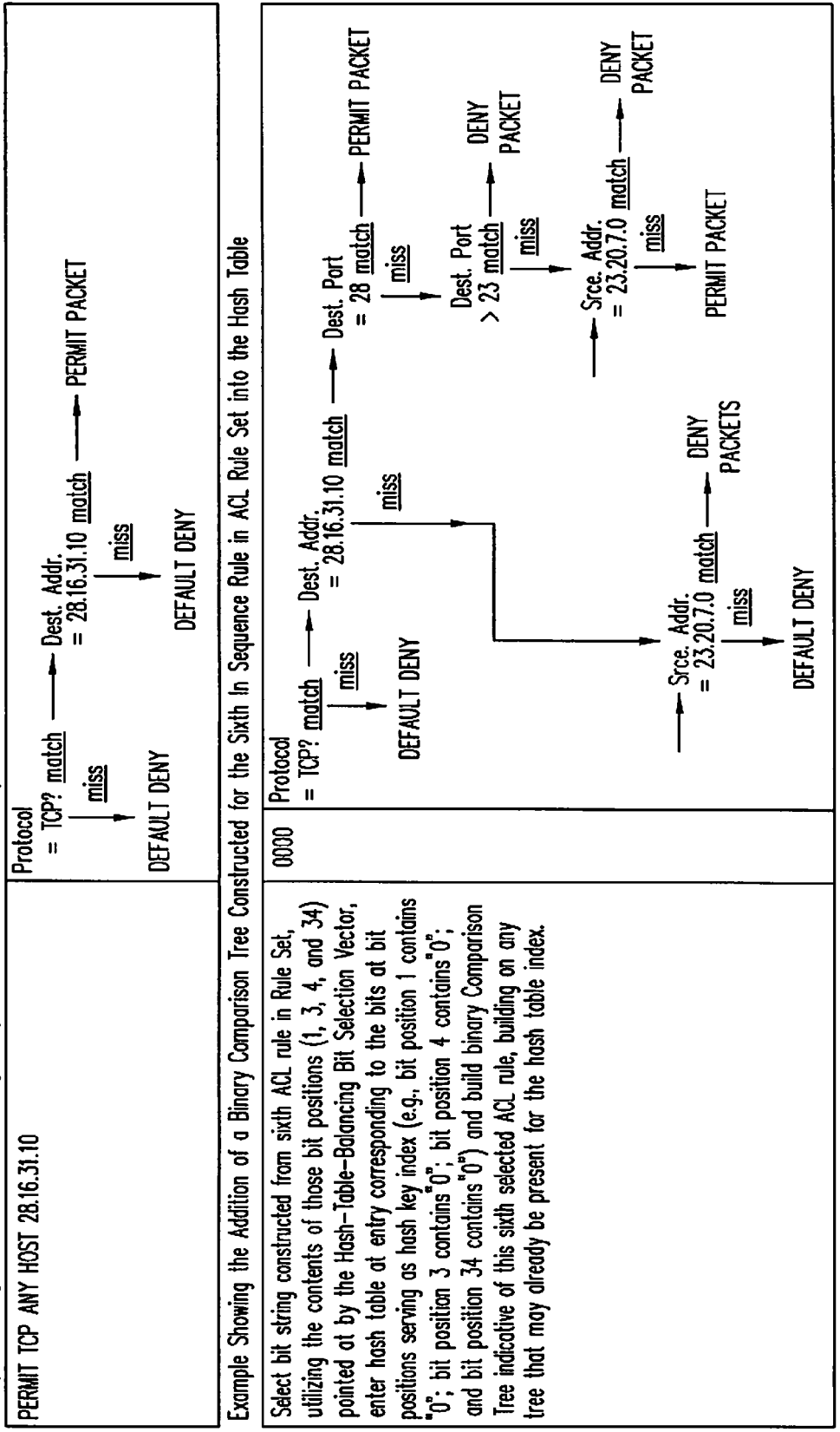
FIG. 7D11

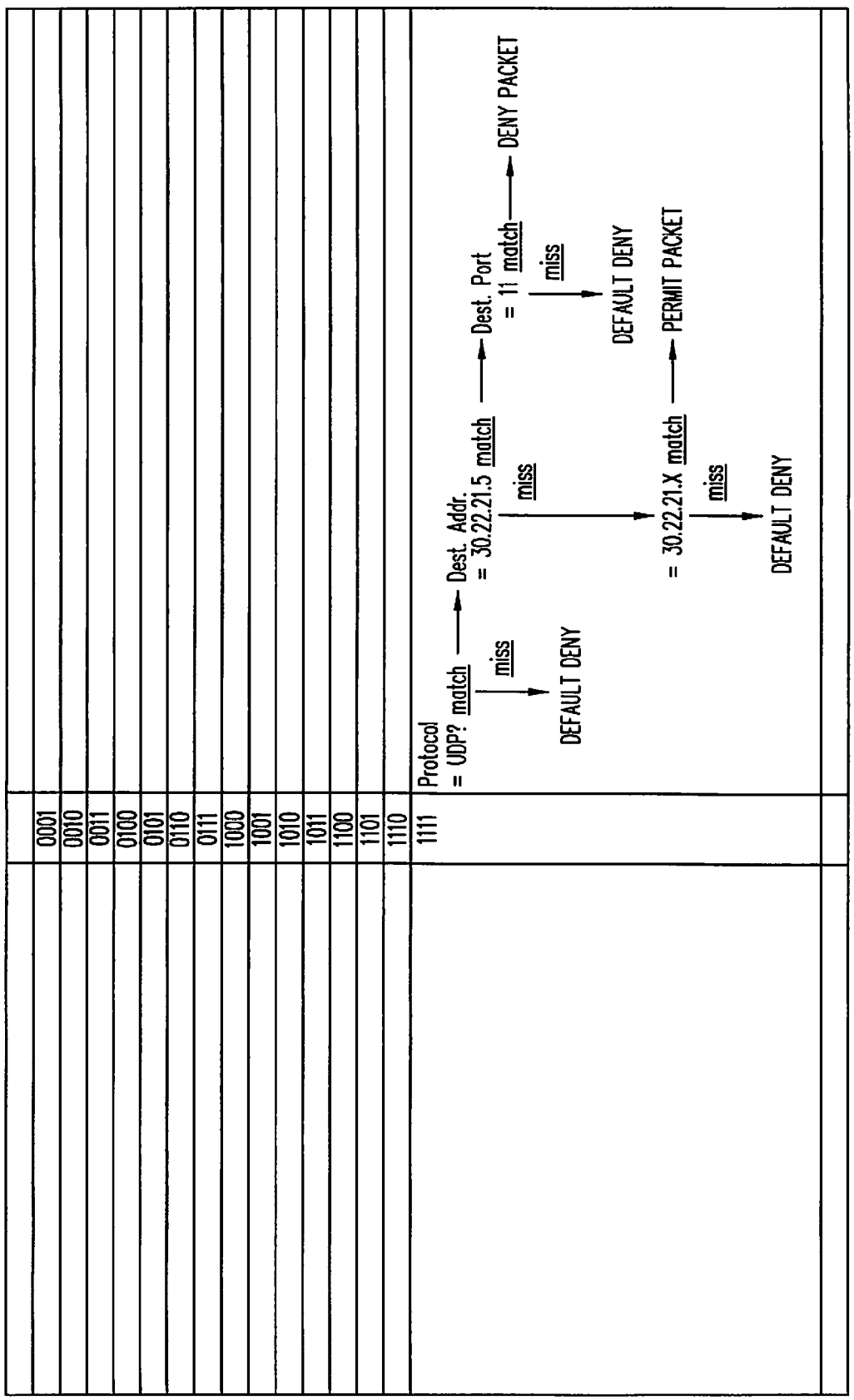
FIG. 7D12

IMPLEMENTING ACCESS CONTROL LISTS USING A BALANCED HASH TABLE OF ACCESS CONTROL LIST BINARY COMPARISON TREES

REFERENCE TO APPENDIX

An appendix, which will subsequently be reduced to microfiche, accompanies this application. The accompanying appendix is hereby incorporated by reference herein in its entirety. A portion of the disclosure (particularly the Appendix) of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever.

BACKGROUND OF THE INVENTION

1. Field of the Invention

The present invention is related to a method and system to be utilized in data communications involving at least one data communications network.

2. Description of the Related Art

Data communications is the transfer of data from one or more sources to one or more sinks that is accomplished (a) via one or more data links between the one or more sources and the one or more sinks (b) according to a protocol. A data link is the means of connecting communications facilities or equipment at one location to communications facilities or equipment at another location for the purpose of transmitting and receiving data. A protocol, in communications, computer, data processing, and control systems, is a set of formal conventions that govern the format and control the interactions between at least two communicating functional elements in order to achieve efficient and understandable communications. Examples of protocols are Asynchronous Transfer Mode (ATM) protocol, Internet Protocol (IP), and Transport Control Protocol (TCP).

A data communications network is the interconnection of three or more network stations, (each network station functioning as a data source and/or sink) over one or more data links, which allows communication between the three or more network stations over the one or more data links. A packet-switched data communications network is a network in which data is transmitted and routed through the network in the form of packets. A packet is a sequence of bits that includes data and control signals, where typically the control signals appear in a header part—a sequence of bits forming a first part of the packet—and the data appear in data part—a sequence of bits forming a second part of the packet. In packet-switched networks, data communications network stations (e.g., routers, bridges, gateways, clients, servers, etc.) may be implemented by a variety of techniques, such as software application programs running on interconnected computer systems, Application Specific Integrated Circuits (ASICs), or combinations of software and ASICs implemented within interconnected computer systems. (e.g., the Cisco Systems® Catalyst® family of switches and the Cisco 7xxx family of routers).

As noted, a data communications network is the interconnection of three or more network stations (each network station functioning as a data source and/or sink) over one or more data links. However, within the context of packet-switched networks, the convention within the art is to add to the foregoing definition the additional requirement that the defined packet-switched data communications network be under the control of a defined network administrator—an entity (usually a person or group of persons) responsible for and having ultimate control over a defined group of network stations. Following this convention, when a first defined packet-switched network is connected to a second defined packet-switched network via at least one network station common to both the first defined and second defined networks, such a configuration is conventionally referred to as an "internetwork"—a short hand notation for the phrase "interconnected network of networks." Note that this convention recognizes that two or more networks have been interconnected, but also recognizes that the totality of such interconnected networks itself forms a network. Thus, while the following detailed description describes devices and processes in the context of a network, such detailed description is also equally applicable to internetworks.

As networks, and networks of networks (e.g., the Internet) proliferate, increasing attention is being paid to problems involving network security (e.g., controlling which network stations can communicate with each other). For example, for a commercial lending bank having an intranet (a private network belonging to the bank) which has one or more network stations connected to the Internet, it is common for the bank's network administrator to want to ensure that the only network stations that have access into and out of the bank's intranet are clearly defined and closely controlled. In addition, it is also common for the network administrator to restrict access between various network stations of the bank's intranet. One way that this is conventionally done is to restrict which packets can pass through each network station over which the bank's network administrator has control. In this technique, each network station examines header information of received packets in order to determine how to dispose of the packets (e.g., whether to accept, transmit, reject, or forward the received packets). By controlling, on the basis of information contained in received packet headers, which packets can pass which network stations, the network administrator is able to control access to various parts of his network on either side of each network station. Accordingly, this technique is known in the art as packet level access control.

In the packet-level access control technique, lists of rules are used by each network station to determine which received data packets to accept, transmit, forward, or reject. Since these rules control access to various portions of a network (or more or more internetworks), such rules are conventionally referred to as Access Control Rules. The complete set of rules maintained by an individual network station is conventionally known as an Access Control List (ACL).

An ACL is a set of rules for determining how a network station should dispose of various received packets. ACL rules are typically an ordered list of plain English rules which have been translated into the grammar and syntax understood by the network station where the ACL is to be implemented (e.g., expressed such that the network operating system can interpret and effect the desires expressed in the ordered list of plain English rules). For example, the plain English rule of "Permit TCP packets from any source to host with IP address equal to 194.121.68.173 and TCP port number greater than 1023" can be expressed in network station understandable grammar and syntax as "permit TCP any host 194.121.68.173 GT 1023" (expressed here for sake of example in a grammar and syntax understandable by a network server computer running Cisco Systems' IOS (Internetworking Operating System), but also expressible in other network operating system or computer operating system formats). ACLs can become quite complex and can grow to thousand upon thousands of rules.

When a data packet is received by a network station which disposes of received packets on the basis of an ACL, the packet's header information must be compared against those ACL rules which utilize the information contained within the received packet's header in order to make access control decisions. In addition, such comparisons should be done in the sequential order in which the rules appear in the ACL, since the order in which the rules are arranged in an ACL typically encodes important control information (e.g., if an ACL has a first-in-sequence rule that states "permit packets from source address Memphis to destination address San Francisco," and a second-in-sequence rule that states "deny packets from source address Memphis to any destination address," if the order of evaluation is reversed, the packet from Memphis to San Francisco will never get through the network station).

For an ACL with a relatively small number of rules, comparing a packet's header against the ACL rules causes very little network traffic delay. However, as the number of rules in an ACL grows, the delay associated with comparing packet headers against the ACL rules can be very computationally intensive, and can result in significant network traffic delay above and beyond that associated with smaller ACLs.

While it may seem reasonable that ACLs with a relatively large number of rules will result in significant network delay above and beyond that associated with ACLs with a relatively smaller number of rules, those skilled in the art will recognize that network administrators prefer that adding rules to ACLs maintained by network stations not result in noticeable performance degradation of those network stations.

Techniques exist within the art which provide network stations with the ability to maintain relatively larger ACLs without noticeable degradation of performance over relatively smaller ACLs, but those techniques are not practicable for many situations. For example, some of the most successful techniques have involved a faster and more compact method of converting the ACL rule elements into entries in a content-addressable memory (CAM), but such techniques tend to add overhead to the systems. Furthermore, insofar as that the CAM-based techniques involve a radical design departure from older-generation systems, the newer CAM-based network stations are generally not backwards-compatible with existing network stations.

In many situations, network administrators are dissatisfied with the ACL-related performance of their network stations, but such network administrators have either concluded that the problems are not severe enough to warrant investing in the newer CAM-based network stations, or such network administrators cannot afford the newer CAM-based network stations. In addition, many network station vendors have invested significant research and development funds into their current-generation network stations, and would prefer to extend the life of such current-generation network stations before adopting the radical redesign needed to move to the newer-generation CAM-based network stations. One way of extending the life of such current-generation network stations would be to improve the ability of such network stations to handle relatively long ACLs.

It is therefore apparent that a need exists for a method and system which will provide improved ACL performance for network stations in a relatively cost-effective manner (e.g., in a manner not requiring the use of expensive CAM-based technology). In addition, a need further exists for a method and technique which is substantially backwards-compatible with existing ACL systems, which will thus allow vendors to retro-fit network stations already purchased by customers, and also allow vendors to further extend the life of their current-generation network stations.

The foregoing general discussion of the related art can be supplemented by reference to the following texts, all of which are hereby incorporated by reference in their entireties: Merilee Ford, et. al., *Internetworking Technologies Handbook*, Cisco Press 1997; Karanjit S. Siyan, *Inside TCP/IP*, 3d ed., New Riders Publishing 1997; *Internet Firewalls and Network Security*, 3d ed., New Riders Publishing 1995; D. Brent Chapman and Elizabeth D. Zwicky, *Building Internet Firewalls*, O'Reilly & Associates, 1995; *Network Protocols Configuration Guide, Cisco IOS® Release* 12.0, Cisco Press, 1998; and *Network Protocols Command Reference, IOS Release* 12.0, Cisco Press, 1998.

Cisco Systems, Cisco IOS, and Catalyst are registered trademarks of Cisco Systems, Inc. of San Jose, Calif.

SUMMARY OF THE INVENTION

The inventors named herein have devised a method and system which provide improved ACL performance for network stations (e.g., routers, bridges, switches, network clients, and network servers) in a relatively cost-effective manner (e.g., in a manner not requiring the use of expensive CAM-based technology). The method and system devised are substantially backwards-compatible with existing-generation network stations, and will allow vendors to retro-fit network stations already purchased by customers, and further extend the life of current generation systems sold by such vendors.

The devised method and system provide for implementing Access Control Lists (ACLs) using a Balanced Hash Table of ACL Binary Comparison Trees (ABCTs), where the Balanced Hash Table of ABCTs encodes the replaced ACL. In one embodiment, the method includes but is not limited to receiving at least one packet, and disposing of the received at least one packet in response to a walk of a Balanced Hash Table of ABCTs, where the Balanced Hash Table of ABCTs encodes an Access Control List. In another embodiment, the method further includes converting the Access Control List to the Balanced Hash Table of ABCTs, the Balanced Hash Table of ABCTs encoding the Access Control List. In one embodiment, the system includes means for receiving at least one packet, and means for disposing of the received at least one packet in response to a walk of a Balanced Hash Table of ABCTs, where the Balanced Hash Table of ABCTs encodes an Access Control List. In another embodiment, the system further includes means for converting the Access Control List to the Balanced Hash Table of ABCTs, where the Balanced Hash Table of ABCTs encodes the Access Control List.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 5 illustrates a process by which a binary comparison tree may be constructed for a Rule Under Consideration, such as was referenced in relation to method step 410.

FIGS. 7A-7D12 show an example of the creation of a Hash-Table-Balancing Bit Selection Vector, and the subsequent creation of a Balanced Hash Table of ABCTs.

The use of the same reference symbols in different drawings indicates similar or identical items.

DETAILED DESCRIPTION

Figure 1A:
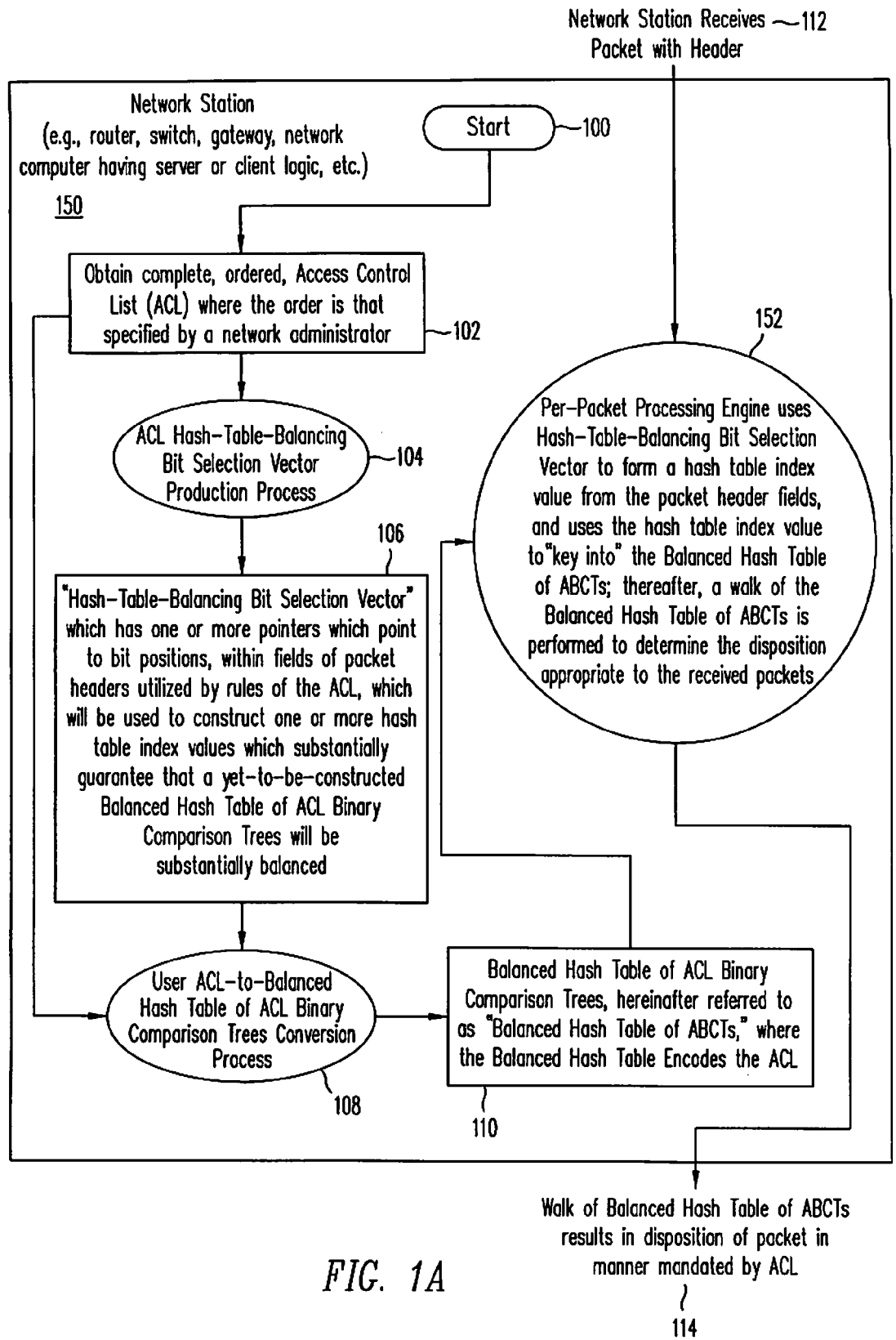
FIG. 1A depicts a high level logic flowchart depicting a process by which a Balanced Hash Table of ACL Binary Comparison Trees is constructed and thereafter utilized within a Per-Packet Processing Engine of a network station (exemplary of any one of many network stations well-known in the art, and which may include, among other things, all or part of the following: a processor, router, bridge, switch, gateway, network server, or network client).

With reference to the figures and in particular with reference now to FIG. 1A, depicted is a high-level logic flowchart depicting a process by which a Balanced Hash Table of ACL Binary Comparison Trees is constructed and thereafter utilized by a per-packet processing engine within network station 150 (where network station 150 is exemplary of any one of many network stations well-known in the art, and which may include, among other things, all or part of the following: a processor, router, bridge, switch, gateway, network server, or network client). Method step 100 illustrates the start of the process. Method step 102 shows obtaining a complete, ordered, ACL utilized within network station 150. Those having ordinary skill in the art will recognize that such an ACL is typically entered by a human network administrator via a graphical user interface of an application program resident upon a network server computer, such network server computer typically having software and/or hardware sufficient to allow it to function as a network router, gateway, and/or bridge.

Method step 104 shows an ACL Hash-Table-Balancing Bit Selection Vector Production Process (discussed in more detail via flowcharts and a specific example, below) receiving the complete, ordered set of ACL Rules. Method step 106 depicts that the ACL Hash-Table-Balancing Bit Selection Vector Production Process outputs and passes to the next method step definitions of certain bit positions within one or more packet header fields utilized by the rules in the ACL, such definitions contained as pointers within what is hereinafter referred to as a "Hash-Table-Balancing Bit Selection Vector" which will be utilized (1) to construct a hash table having a relatively balanced set of entries of ACL binary comparison trees (as used herein "balanced" means that the trees are distributed roughly evenly both in depth and across the entries of the entire hash table), where such constructed hash table will encode the ACL (a process explained in more detail via flowcharts and a specific example, below) and, (2) to thereafter construct hash table index values used to "key into" the constructed Balanced Hash Table of ACL Binary Comparison Trees once the Balanced Hash Table of ACL Binary Comparison Trees has been successfully deployed in per-packet processing engine 152.

Method step 108 shows that an ACL-to-Balanced Hash Table of ACL Binary Comparison Tree Conversion Process (discussed in more detail below by way of a flowchart and a specific example), receives the Hash-Table-Balancing Bit Selection Vector specified by the ACL Hash-Table-Balancing Bit Selection Vector Process and also receives the complete, ordered, ACL. Thereafter, method step 108 depicts that the ACL-to-Balanced Hash Table of ACL Binary Comparison Tree Conversion Process, utilizing the Hash-Table-Balancing Bit Selection Vector and the complete, ordered, ACL, creates and outputs what is referred to herein as a Balanced Hash Table of ACL Binary Comparison Trees which actually encodes the ACL, such Balanced Table of ACL Binary Comparison Trees being hereinafter referred to as a Balanced Hash Table of ABCTs (the production of which is discussed in more detail below by way of a flowchart and a specific example).

Method step 110 depicts that the ACL-to-Balanced Hash Table of ACL Binary Comparison Tree Conversion Process outputs and passes to the next method step a Balanced Hash Table of ABCTs, which method step 152 shows is thereafter accepted by a per-packet processing engine resident within and utilized by a network station 150 to effect the mandates encoded in the ACL rules.

Event 112 illustrates that subsequent to acceptance of the Balanced Hash Table of ABCTs by per-packet processing engine 150, network station 150 receives packets, and the per-packet processing engine utilizes the Hash-Table-Balancing Bit Selection Vector to create from the header of the received packets a hash table index value which is used to "key into" the Hashed Table of Balanced ACL Trees, and thereafter walk the Balanced Hash Table of ABCTs to determine the appropriate disposition of the received packet as dictated by the complete, ordered, ACL. Event 114 depicts that the walk of the Balanced Hash Table of ABCTs results in disposition of the received packets, referenced in event 112, in the manner indicated by the ACL.

Figure 1B:
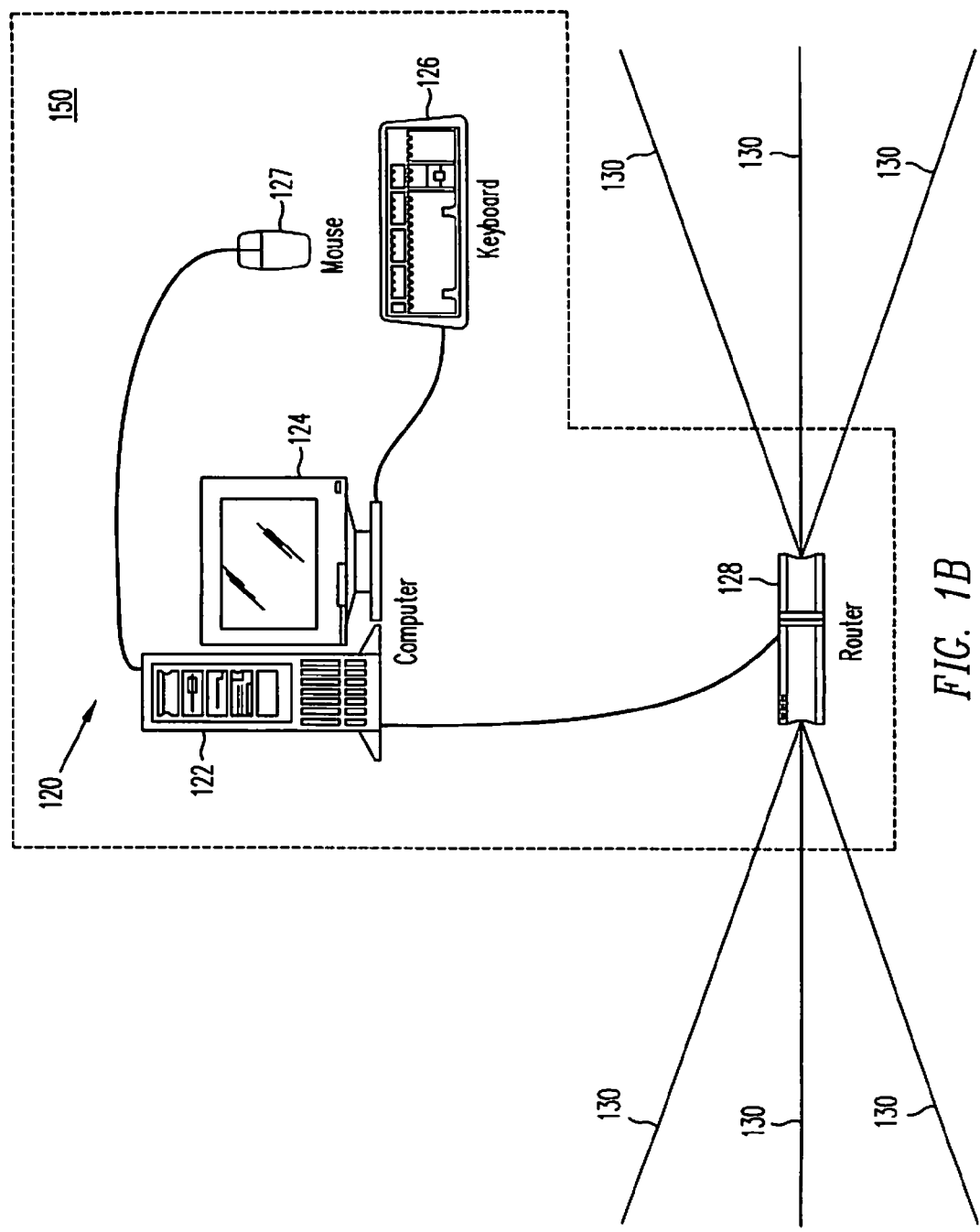
FIG. 1B depicts a pictorial representation of an example of network station 150

With reference now to FIG. 1B depicted is a pictorial representation of an example of network station 150. Depicted is network station 150. Shown present and associated with network station 150 are computer system unit 122 respectively coupled to video display device 124, keyboard 126, mouse 127, and router 128. Depicted is that router 128 is connected with communication lines 130 whereby one or more data packets may enter and exit network station 150. Network station 150 may be implemented utilizing any suitable computer system (e.g., workstations, minicomputers, mainframe computers, or network-application specific computers) and router. Those skilled in the art will recognize that various implementations of network station 150 can have many different components, such as multiprocessors, random-access memory, read-only memory, various bus types, disk and tape drives, graphical user interfaces, etc. In addition, network station 150 is merely exemplary and it is to be remembered that network stations referred to herein may be implemented by a variety of techniques, including but not limited to software application programs running on interconnected computer systems, Application Specific Integrated Circuits (ASICs), or combinations of software and ASICs implemented within interconnected computer systems. (e.g., the Cisco Systems® Catalyst® family of switches and the Cisco 7xxx family of routers).

Figure 2:
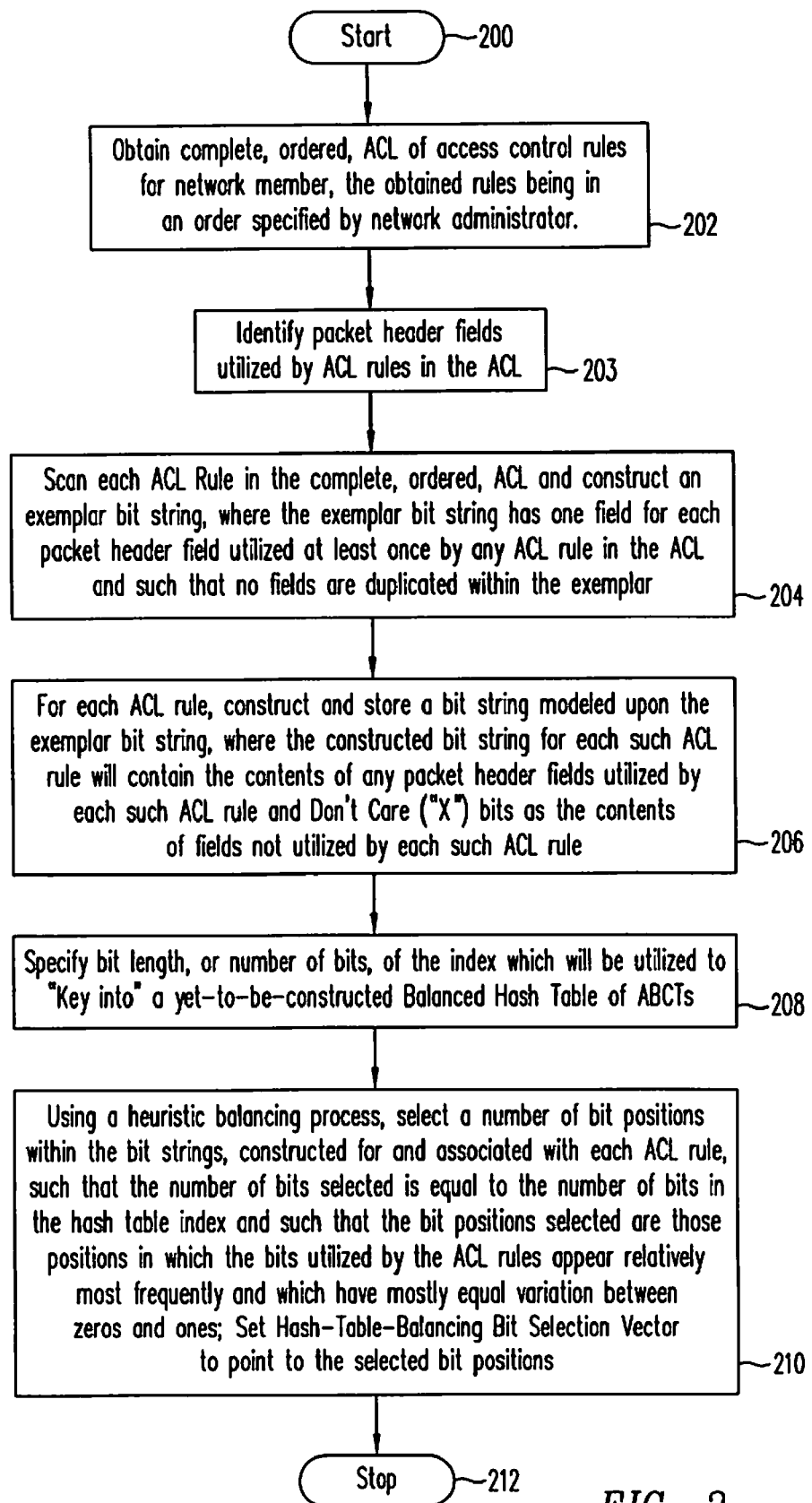
FIG. 2 illustrates a high-level logic flowchart depicting the ACL Hash-Table-Balancing Bit Selection Vector Production Process.

Referring now to FIG. 2, illustrated is a high-level logic flowchart depicting the ACL Hash-Table-Balancing Bit Selection Vector Production Process. Method step 200 shows the start of the process. Method step 202 depicts obtaining the complete, ordered, ACL (previously referenced in relation to method step 102) utilized within network station 150. Method step 203 illustrates identifying the packet header fields which are utilized by the ACL Rules in order to make access control decisions. Thereafter, method step 204 depicts scanning each packet header utilized by each ACL rule in the complete, ordered, ACL, and constructing an exemplar aggregate bit string, where the exemplar aggregate bit string has one field corresponding to each packet header field utilized by any ACL Rule in the ACL and such that no fields are duplicated within the exemplar bit string (that is, even if two different ACL rules utilize the same packet header field, only one instance of the packet header field will appear in the exemplar, even though two rules use that field).

Thereafter, method step 206 depicts constructing, by using the packet identification criteria (i.e., fields) utilized by each ACL rule in the complete, ordered, ACL referenced in method step 202, a bit string having the same fields as the constructed exemplar aggregate bit string referenced in method step 204, where each constructed bit string for each rule has as the contents of its (the constructed bit string's) fields the contents of the fields utilized for each such rule, and "don't care" entries for fields not utilized by each such ACL Rule.

Figures 2, 3A:
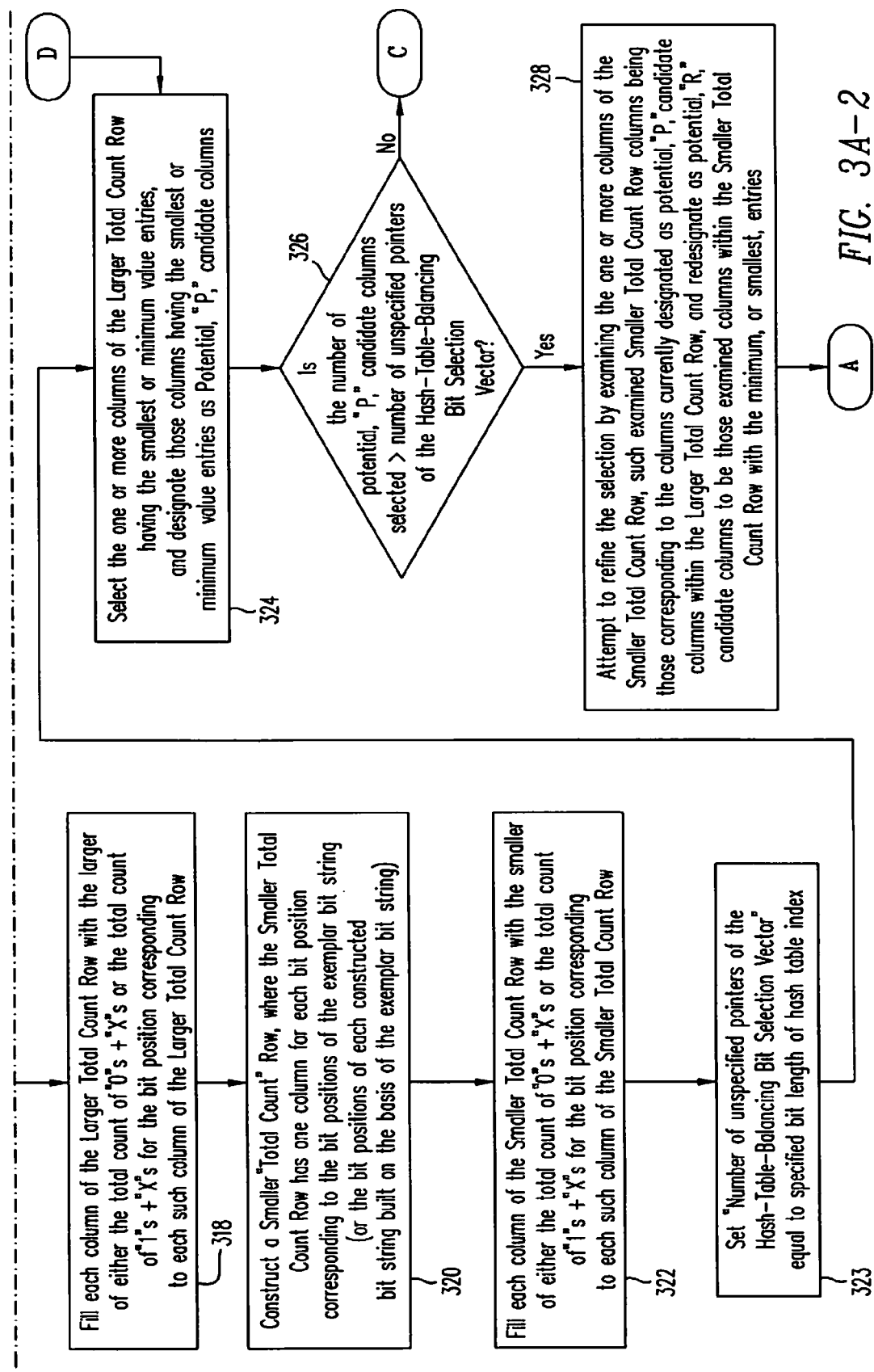
FIGS. 3A and 3B show a high-level logic flowchart illustrating the "heuristic balancing process" referred to in method step 208.
Figure 3B:
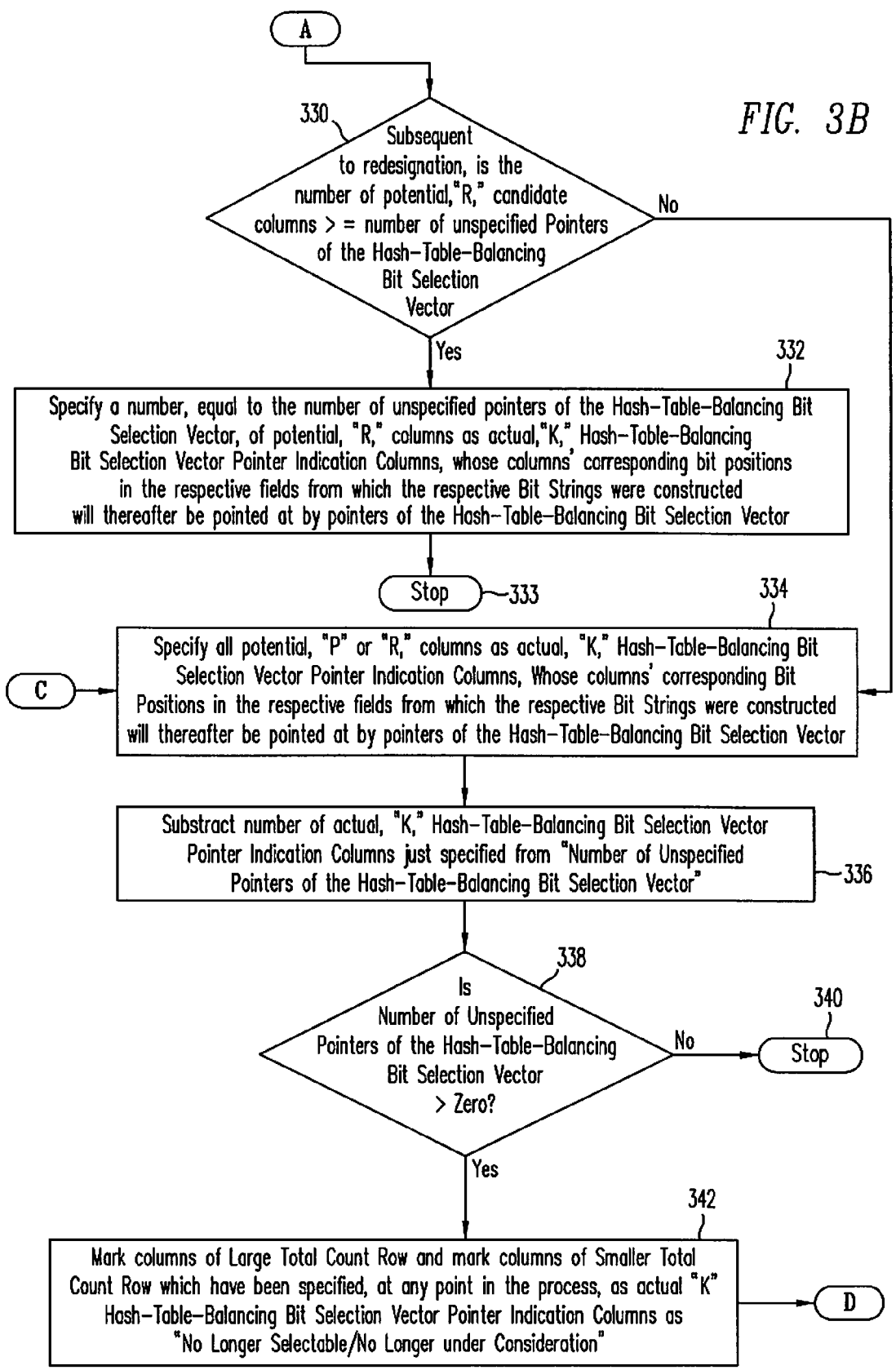

Method step 208 shows obtaining, or alternatively specifying, the number of bits (or "bit length") to be utilized in an index of a yet-to-be constructed Balanced Hash Table of ABCTs. Thereafter, method step 210 depicts utilizing a "heuristic balancing" process (discussed in more detail below by way of a flowchart and a specific example) to construct a Hash-Table-Balancing Bit Selection Vector which has pointers (the number of pointers selected is equal in number to the specified bit length of the hash table index) to those bit positions utilized by the ACL rules, where the "heuristic balancing" process selects those bit positions which both (1) are utilized with relative frequency by the ACL Rules and (2) have entries within the selected bit positions that are roughly equally distributed amongst logical "1"s (ones) and logical "0"s (zeroes);

With reference now to FIGS. 3A and 3B, shown is a high-level logic flowchart illustrating the "heuristic balancing process" referred to in method step 208. Method step 300 depicts the start of the process. Method step 302 illustrates obtaining the bit strings, referenced in method step 206, constructed for each ACL rule.

Method step 304 shows aligning the bit positions of each obtained constructed bit string referenced in method step 302; that is, each constructed bit string is aligned such that each field in the constructed bit string matches with the appropriate field in every other constructed bit string, and thus each bit position within each constructed bit string is also so-aligned—the foregoing is possible because each bit string for each rule was constructed utilizing the exemplar bit string referenced in method step 204 of FIG. 2.

Method step 306 depicts that the leftmost aligned bit position within the aligned bit strings is defined to be the "current aligned bit position." Thereafter, method step 308 illustrates that, for the current aligned bit position (1) a count is made of the number of "1"s (logical ones) appearing in that current aligned bit position amongst all the bit strings constructed from the ACL Rules in the ACL, (2) a count is made of the number of "0"s (logical zeroes) appearing in that current aligned bit position amongst all the bit strings constructed from the ACL Rules in the ACL, and (3) a count is made of the number of "X"s (logical "don't care" bits) appearing in that current aligned bit position amongst all the bit strings constructed from the ACL Rules in the ACL.

Method step 310 shows that once a count has been made of the "1"s, "0"s, and "X"s appearing in the current aligned bit position amongst all the bit strings constructed from the ACL Rules in the ACL, the count of the "1"s is summed with the count of the "X"s to obtain a "Total '1's+'X's Count" for the current aligned bit position; also shown is that the count of the "0"s is summed with the count of the "X"s to obtain a "Total '0's+'X's Count" for the current aligned bit position.

Method step 312 depicts an inquiry as to whether the current aligned bit position is the last position in the aligned constructed bit strings. Method step 314 shows that if the inquiry of method step 312 yields a determination that the current aligned bit position is NOT the last position in the constructed bit strings, the current aligned bit position is redefined as the next-rightwards bit position of the aligned constructed bit strings. Thereafter, the process proceeds to method step 308 and continues from that point.

Method step 316 depicts that if the inquiry of method step 312 yields a determination that the current aligned bit position is the last position in the constructed bit strings, a "Larger Total Count" row (in one embodiment, 1×N matrix, where N is equal to the total number of bit positions in the exemplar bit string referenced in method step 204 above) having one column corresponding to each bit position in one of the constructed bit strings (i.e., a column for each bit position in the exemplar bit string reference in method step 204) is created.

Method step 318 shows that each column entry of the "Larger Total Count" row is filled with the LARGER of either the "Total '1's+'X's Count" or the "Total '0's+'X's Count" for the bit positions of the constructed bit strings corresponding to each such column entry of the Larger Total Count row.

Method step 320 illustrates that a "Smaller Total Count" row (in one embodiment, 1×N matrix, where N is equal to the total of bit positions in the exemplar bit string referenced in method step 204 above) having one column corresponding to each bit position in one of the constructed bit strings (i.e., a column for each bit position in the exemplar bit string reference in method step 204) is created.

Method step 322 shows that each column entry of the "Smaller Total Count" row is filled with the SMALLER of either the "Total '1's+'X's Count" or the "Total '0's+'X's Count" for the bit positions of the constructed bit strings corresponding to each such column entry of the Smaller Total Count row.

Method step 323 shows that the number of Unspecified Pointers of Hash-Table-Balancing Bit Selection Vector is set equal to the bit length of the hash table index specified in method step 208 of FIG. 2.

Method step 324 depicts that the one or more columns of the Larger Total Count row referenced in method step 318 having the minimum value within the Larger Total Count row are selected and designated as potential, "P," candidate columns which will be used to construct the pointers of the Hash-Table-Balancing Bit Selection Vector, which means that the bit positions (of the constructed bit strings/exemplar bit string) corresponding to the selected columns are potential candidates for use as the Hash Table Index.

Method step 326 illustrates an inquiry as to whether the number of potential, "P," candidate columns selected in method step 324 is greater than the number of Unspecified Pointers of Hash-Table-Balancing Bit Selection Vector. In the event that the inquiry illustrated in method step 326 yields a determination that the number of potential, "P," candidate columns selected in method step 324 is greater than the number of Unspecified Pointers of Bit Position Vector, the process proceeds to method step 328 which shows that an attempt is made to refine the selection of the potential, "P," candidate columns referenced in method step 324 by examining the one or more columns of the Smaller Total Count row, such examined Smaller Total Count row columns being those corresponding to the columns currently designated as potential, "P," candidate columns within the Larger Total Count row; further shown is that those examined columns within the Smaller Total Count row with the minimum, or smallest, entries are redesignated as potential, "R," candidate columns. Thereafter, method step 330 shows that an inquiry is made as to whether the total number of redesignated potential, "R," candidate columns is greater than or equal to the number of Unspecified Pointers of the Hash-Table-Balancing Bit Selection Vector.

In the event that the inquiry of method step 330 yields a determination that the number of redesignated potential, "R," candidate columns are greater than or equal to the number of the Unspecified Pointers of the Hash-Table-Balancing Bit Selection Vector, the process proceeds to method step 332 which depicts that a number, equal to the number of Unspecified Pointers of the Hash-Table-Balancing Bit Selection Vector, of potential "R" candidate columns are designated as actual "K" Hash-Table-Balancing Bit Selection Vector Pointer Indication Columns, which means that the bit positions corresponding to those "K" candidate columns are those bit positions which will be pointed at by pointers of the Hash-Table-Balancing Bit Selection Vector. Thereafter, insofar as that the Hash-Table-Balancing Bit Selection Vector has now been completely specified, the process proceeds to method step 333 and stops.

In the event that the inquiry of method step 330 yields a determination that the number of redesignated potential, "R," candidate columns are less than the number of Unspecified Pointers of the Hash-Table-Balancing Bit Selection Vector, the process proceeds to method step 334 which depicts that the potential "P" candidate columns are designated as actual "K" Hash-Table-Balancing Bit Selection Vector Pointer Indication Columns, which means that the bit positions corresponding to those "K" Hash-Table-Balancing Bit Selection Vector Pointer Indication Columns are those bit positions which will be pointed at by pointers of the Hash-Table-Balancing Bit Selection Vector. Subsequently, method step 336 illustrates the number of actual "K" Hash-Table-Balancing Bit Selection Vector Pointer Indication Columns referenced in method step 332 is subtracted from the number of Unspecified Pointers of Hash-Table-Balancing Bit Selection Vector.

Method step 338 shows the inquiry as to whether the number of Unspecified Pointers of the Hash-Table-Balancing Bit Selection Vector is greater than zero. If the inquiry depicted in method step 338 results in a determination that the number of Unspecified Pointers of the Hash-Table-Balancing Bit Selection Vector is NOT greater than zero, the process proceeds to method step 340 and stops. If the inquiry depicted in method step 338 results in a determination that the number of Unspecified Pointers of the Hash-Table-Balancing Bit Selection Vector is greater than zero, the process proceeds to method step 342 which depicts that the columns of "Larger Total Count" Row and the columns "Smaller Total Count" Row which have previously been designated as "K" Hash-Table-Balancing Bit Selection Vector Pointer Indication Columns in any method step, at any iteration through the process depicted in FIGS. 3A and 3B, are marked as "no longer selectable" (this ensures that the columns/bit positions subsequently designated as "K" Hash-Table-Balancing Bit Selection Vector Pointer Indication Columns will be bit positions that have not yet been so designated). Thereafter, with Larger Total Count row and Smaller Total Count row so adjusted (that is, with the Larger Total Count and Smaller Total Count row columns which have ever been designated as "K" Hash-Table-Balancing Bit Selection Vector Pointer Indication Columns being marked as no longer selectable, or under consideration), the process proceeds to method step 324 and continues from that point.

Notice that the process will loop until the number of candidates "K" necessary to completely specify the Pointers of Hash-Table-Balancing Bit Selection Vector have been designated.

In the event that the inquiry illustrated in method step 326 yields a determination that the number of columns selected in method step 324 is not greater than the number of Unspecified Pointers of Bit Position Vector, the process proceeds to method step 334, which depicts that the potential, "R," candidate columns are designated as actual "K" Hash-Table-Balancing Bit Selection Vector Pointer Indication Columns, which means that the bit positions corresponding to those "K" Hash-Table-Balancing Bit Selection Vector Pointer Indication Columns are those bit positions which will be pointed at by pointers of the Hash-Table-Balancing Bit Selection Vector. Thereafter, the process proceeds to method step 336 and continues from that point.

Figure 4:
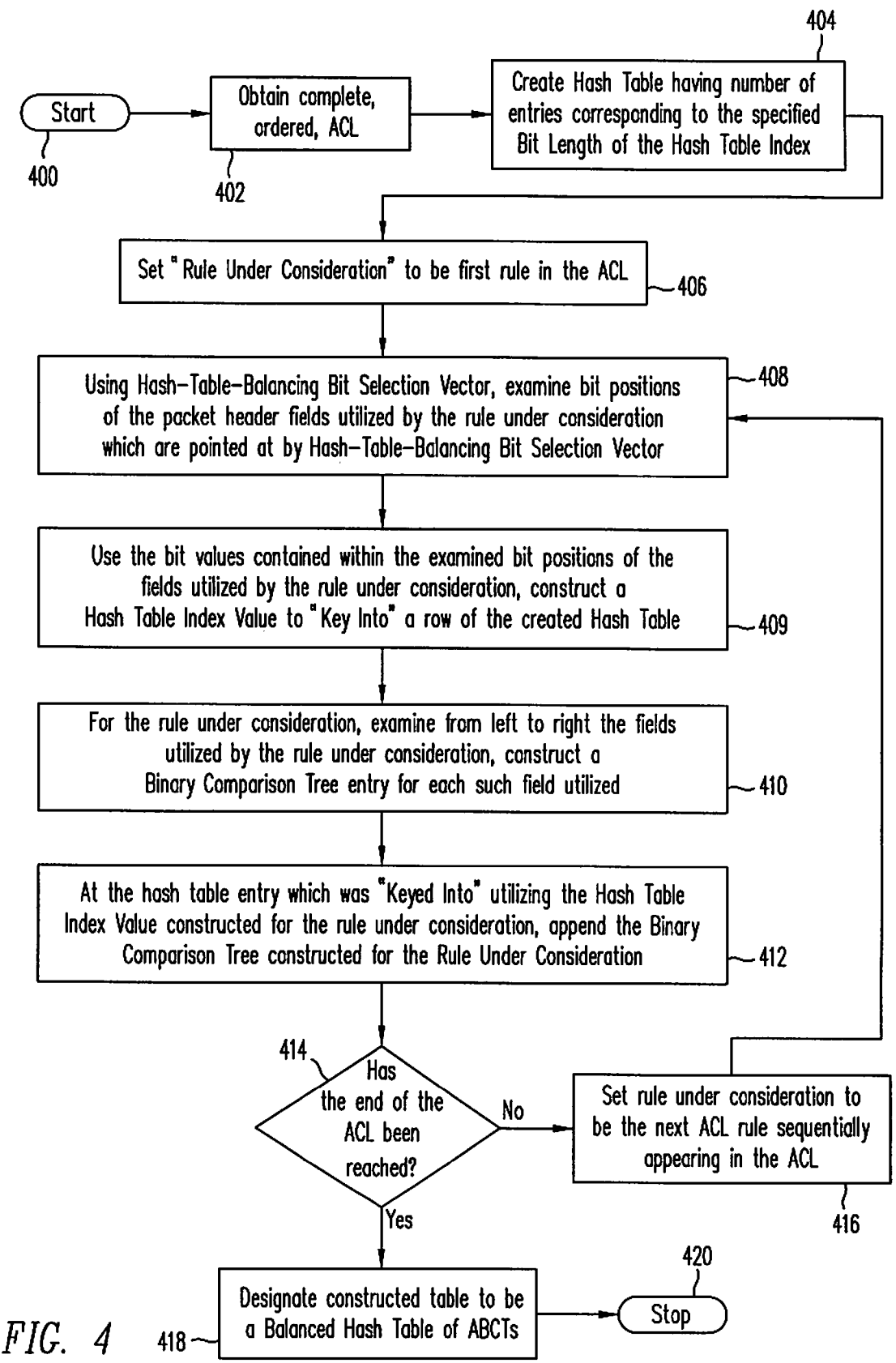
FIG. 4 depicts a high-level logic flowchart illustrating the ACL-to-Balanced Hash Table of ACL Binary Comparison Tree Conversion Process.
Figure 6A:
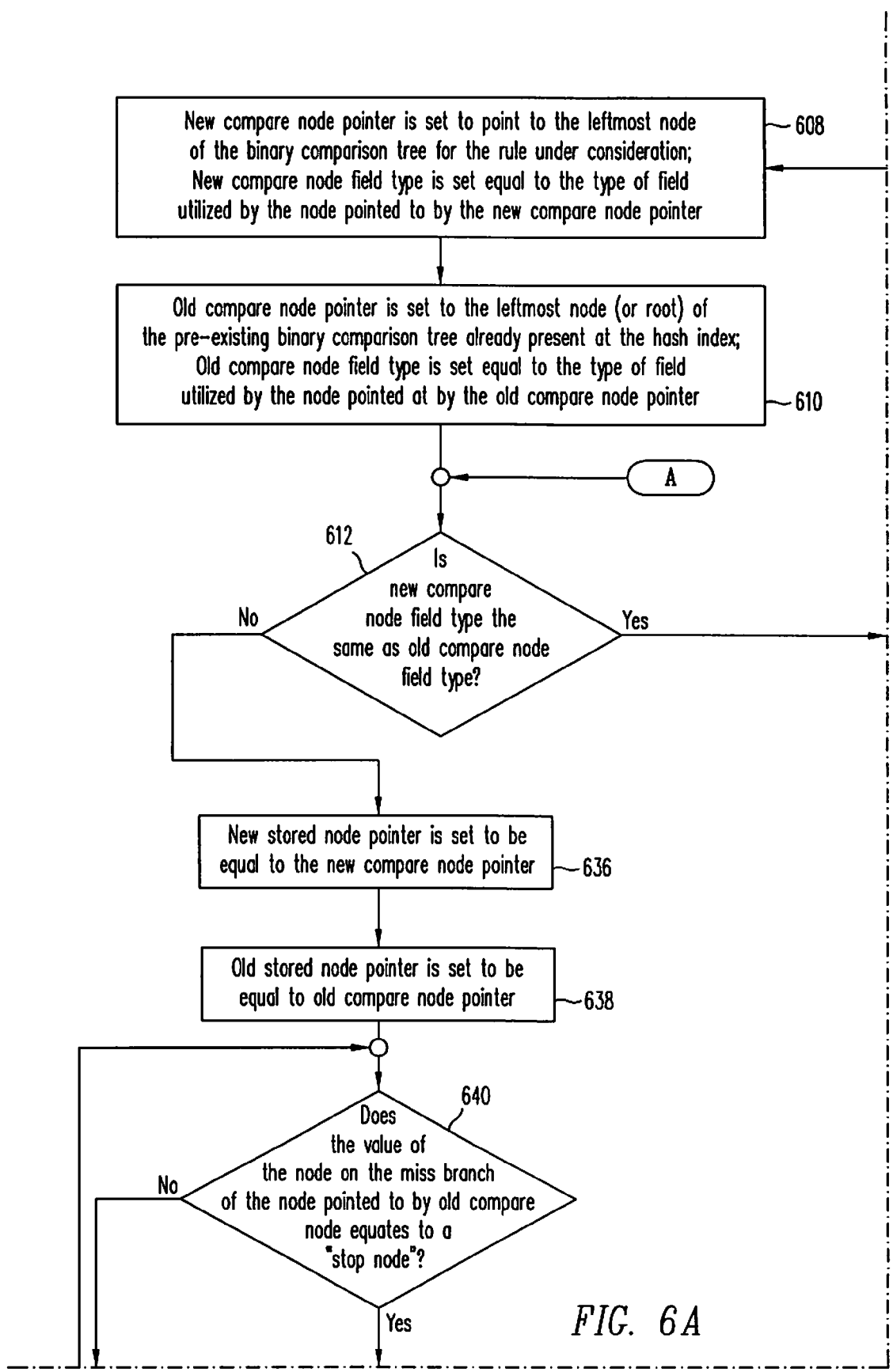
FIG. 6 illustrates a process by which the binary comparison tree constructed for the Rule Under Consideration may be added to a hash table.
Figure 6B:
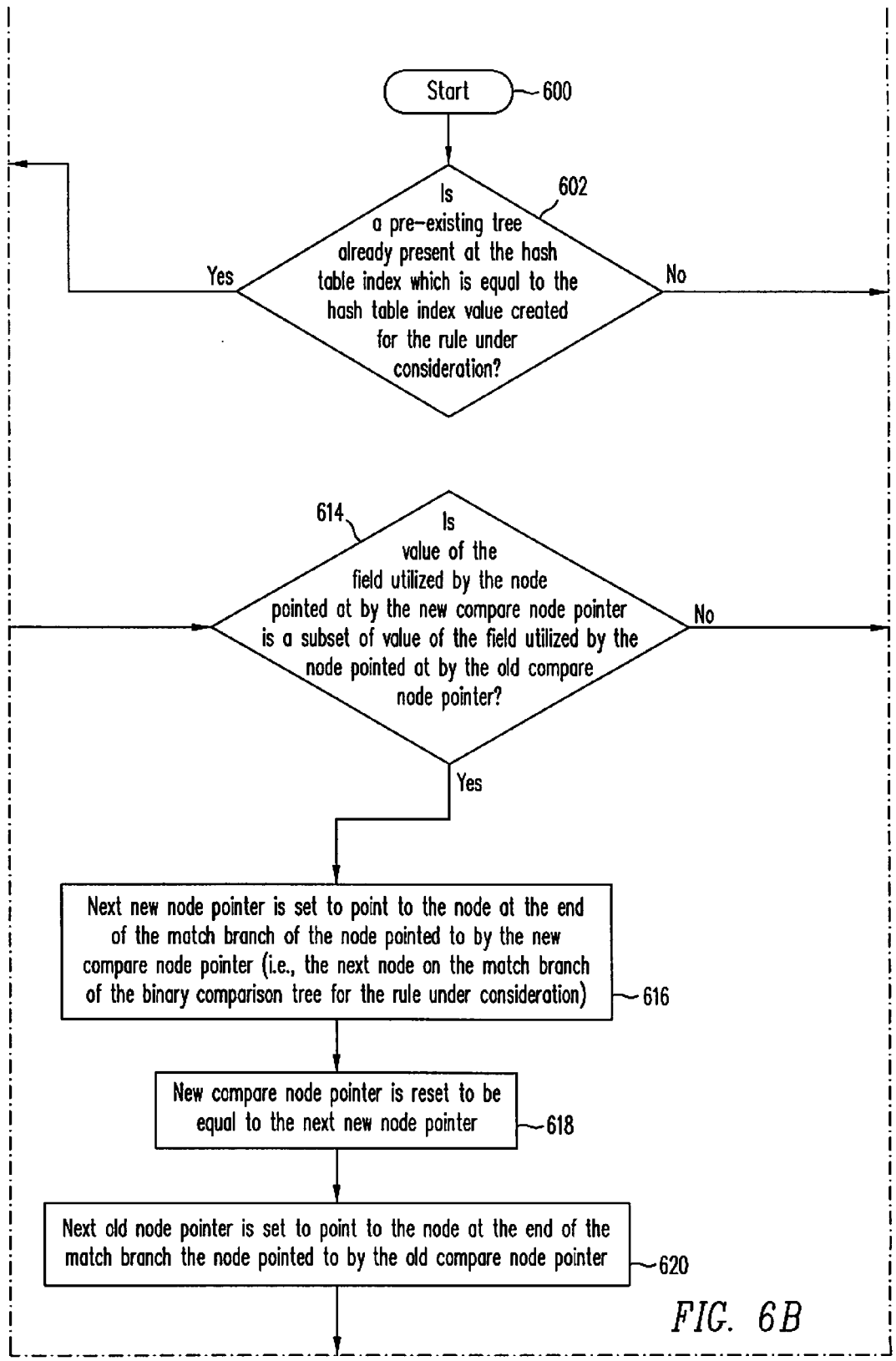
Figure 6C:
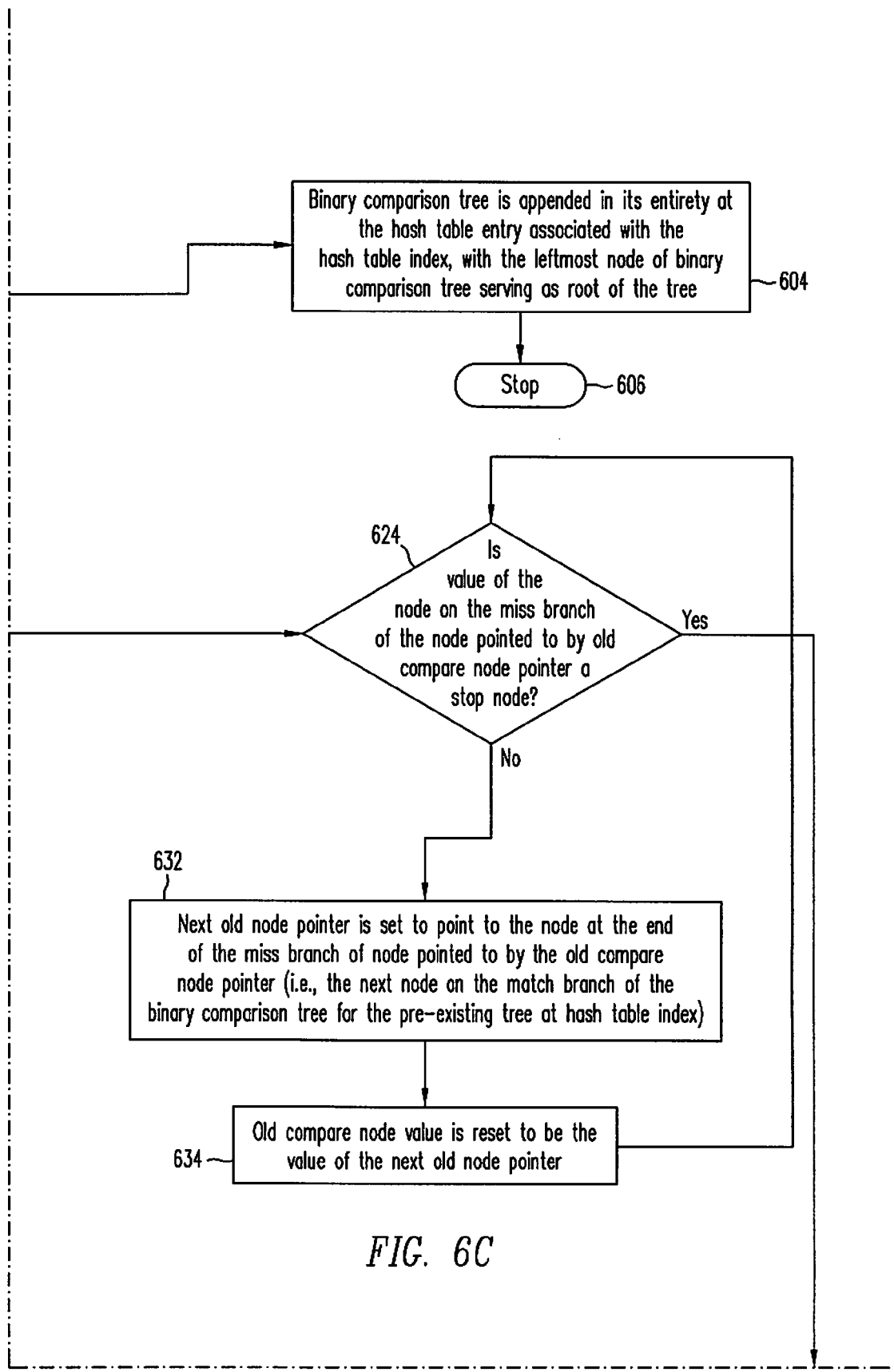
Figure 6D:
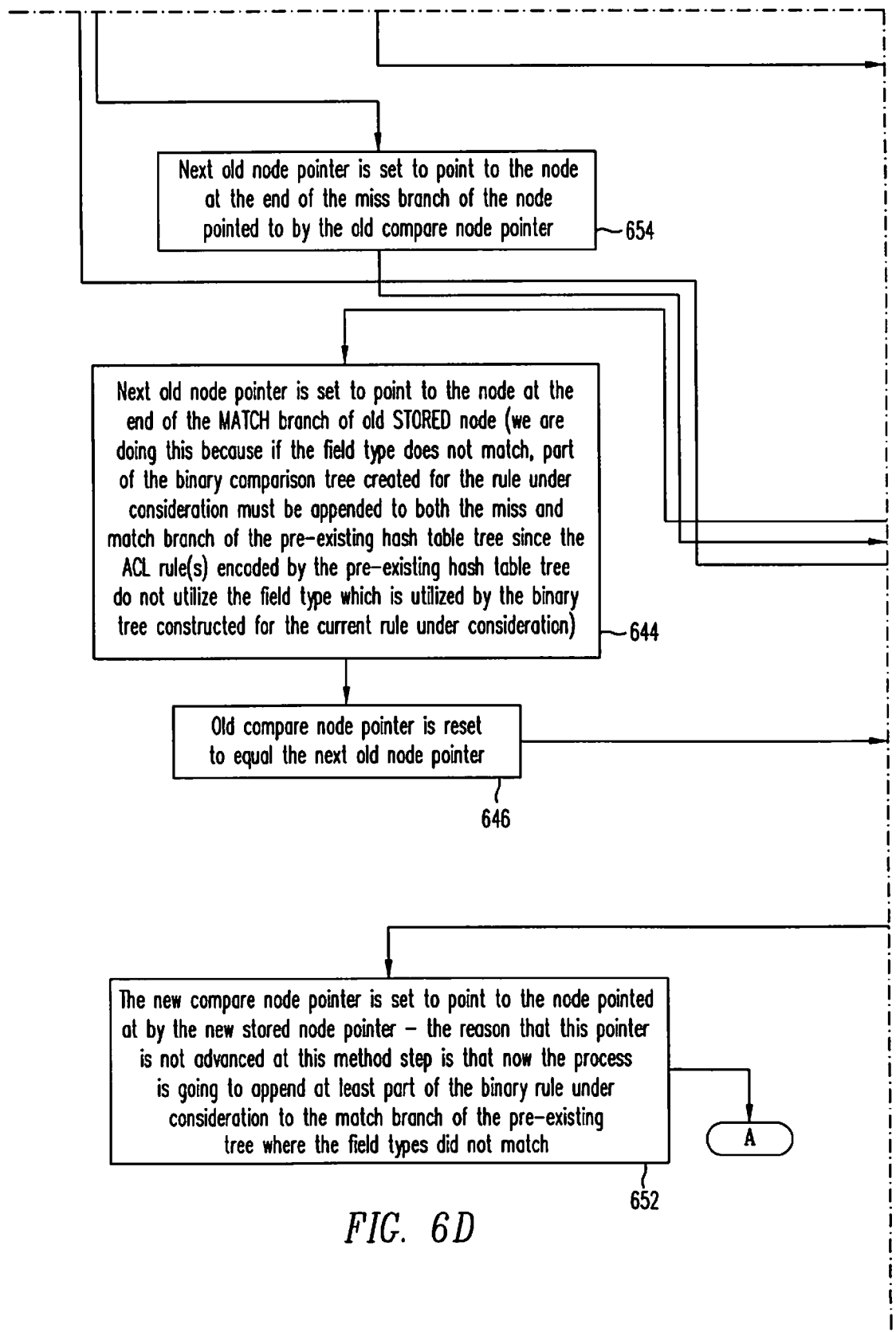
Figure 6E:
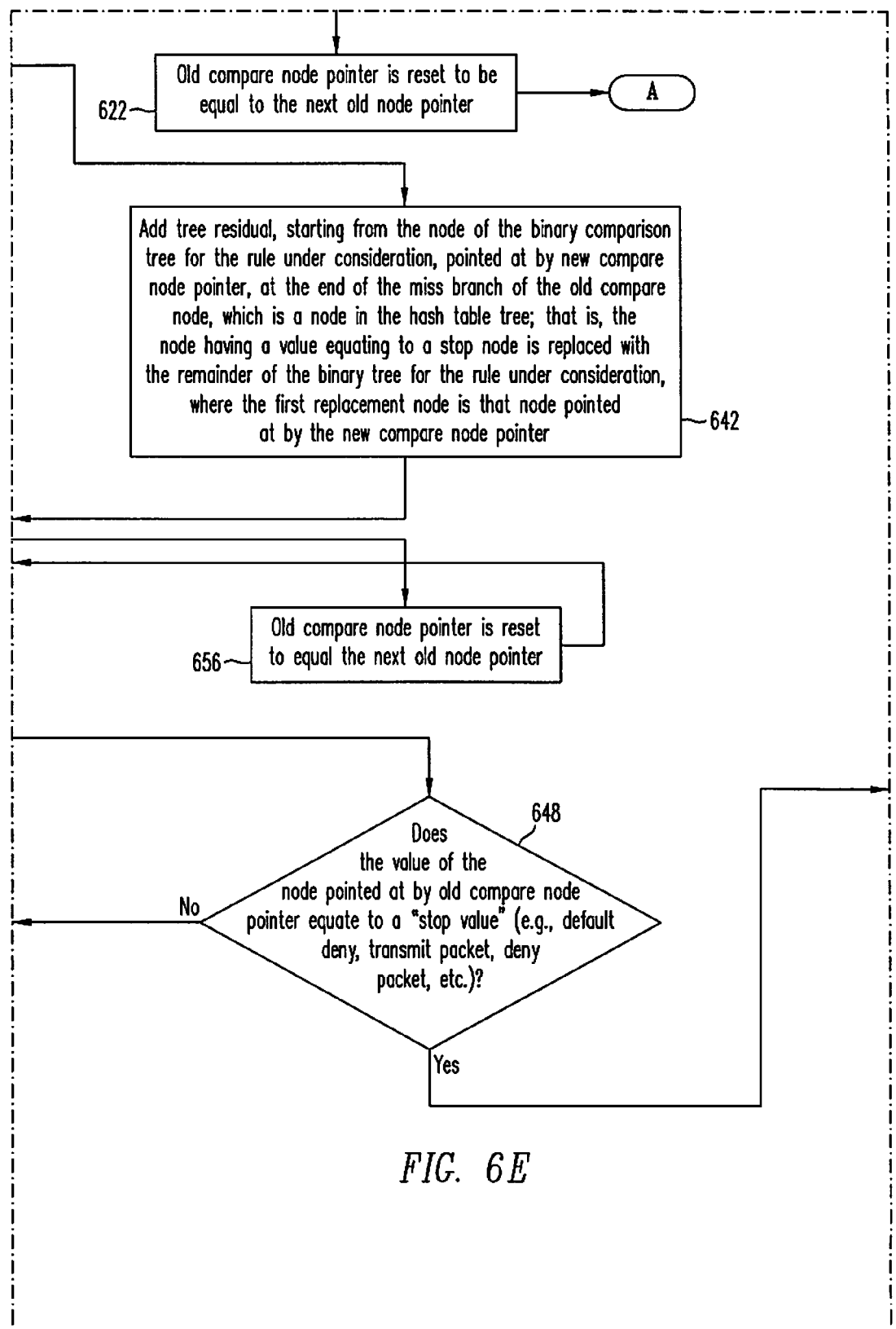

Referring now to FIG. 4, depicted is a high-level logic flowchart illustrating the ACL-to-Balanced Hash Table of ACL Binary Comparison Tree Conversion Process. Method step 400 shows the start of the process. Method step 402 depicts that the complete, ordered, ACL referenced within method step 102 is obtained. Method step 404 illustrates the creation of a hash table having a number of entries corresponding to the bit length specified for the hash table index (i.e., that specified in method step 208); for example, a 2 bit length index would have a hash table with 4 entries, a 3 bit length index would have a hash table with 8 entries, a 4 bit index would have a hash table with 16 entries, etc. Method step 406 shows that a "Rule Under Consideration" is set to be the first rule in the ACL. Method step 408 shows that the bit positions, previously designated as "K" Hash-Table-Balancing Bit Selection Vector Pointer Indication Columns (i.e., the bit positions pointed at by the pointers of the Hash-Table-Balancing Bit Selection Vector), in the fields utilized by the Rule Under Consideration are examined. Method step 409 depicts that that the bit entries in those examined bit positions (i.e., those bit positions pointed at by the pointers of the Hash-Table-Balancing Bit Selection Vector) are utilized to construct an hash table index value, used to "key into" the created hash table. Those skilled in the art will recognize that there are many ways such could be done, but one way would be to utilize the hash table index as part of the memory address of the table.

Method step 410 shows that once the appropriate row entry of the hash table has been keyed to using the hash table index value for the Rule Under Consideration, the fields utilized by the Rule Under Consideration are examined in a left-to-right fashion, and a binary comparison tree is constructed for the Rule Under Consideration (construction of a binary comparison tree is illustrated via a flowcharts and a specific example, below). Thereafter, method step 412 (discussed in more detail via flowcharts and a specific example, below) shows that the constructed binary comparison tree for the Rule Under Consideration is appended to the hash table entry associated with the hash table index equal to the hash table index value constructed for the Rule Under Consideration. With respect to the constructed hash table index value, if one of the bit positions of the constructed hash table index value contains an "X" value, then the tree for the Rule Under Consideration will be appended in the hash table both where such bit position index equals "1" and "0"; for example, if an index turned out to be 11X, the binary comparison tree for the Rule Under Consideration would be appended to the hash table index values 111 and 110.

Method step 414 depicts the inquiry as to whether the end of the complete, ordered, ACL referenced within method step 102 has been reached. If the inquiry depicted in method step 414 yields a determination that the end of the complete, ordered, ACL has NOT been reached, method step 416 shows that the Rule Under Consideration is set to be the next ACL rule in sequence within the complete, ordered, ACL. Thereafter, the process proceeds to method step 406 and continues from that point.

If the inquiry depicted in method step 414 yields a determination that the end of the complete, ordered, ACL has been reached, method step 418 depicts that the resultant hash table with the appended binary trees is designated as a Balanced Hash Table of ABCTs. Thereafter, the process proceeds to method step 420 and stops.

With reference now to FIG. 5, illustrated is a process by which a binary comparison tree may be constructed for a Rule Under Consideration, such as was referenced in relation to method step 410. The following method steps refer to inserting compare nodes in a binary comparison tree. It is to be understood that when a node is so inserted, the insertion is such that the miss branch of the inserted node will point to "DEFAULT DENY" and the match branch of the inserted node will point to a place-holder for the next node to be inserted, unless the insertion is related to the insertion of a "stop" node (a "stop" node does not have a miss or match branch but instead contains the ultimate dispensation of the rule, such as "PERMIT," "DENY," "FORWARD," etc.).

Method step 500 shows the start of the process. Method step 502 depicts the inquiry as to whether the Rule Under Consideration makes a decision based upon the protocol field of received packet headers. In the event that the inquiry depicted in relation to method step 502 yields a determination that a decision is NOT made based upon the protocol field of received packet headers, the process proceeds to method step 506 and continues from that point. In the event that the inquiry depicted in relation to method step 502 yields a determination that a decision is made based upon the protocol field of received packet headers, the process proceeds to method step 504 wherein is depicted the operation of inserting a protocol compare node, having separate miss and match branches consistent with the protocol field of the Rule Under Consideration, into a binary comparison tree (notice that this is the first insertion of a compare node into the binary compare tree). Thereafter, the process proceeds to method step 506 wherein is depicted the inquiry as to whether the Rule Under Consideration makes a decision based upon the source address field of received packet headers.

In the event that the inquiry depicted in relation to method step 506 yields a determination that a decision is NOT made based upon the source field of received packet headers, the process proceeds to method step 510 and continues from that point. In event that the inquiry depicted in method step 506 yields a determination that the Rule Under Consideration does make a decision based upon the source address field of received packet headers, the process proceeds to method step 508 wherein is depicted that a source address compare node, having separate miss and match branches consistent with the source address field of the Rule Under Consideration, is appended to the preceding compare node. Thereafter, the process proceeds to method step 510 wherein is depicted the inquiry as to whether the Rule Under Consideration makes decisions based upon the source port field of received packet headers.

In the event that the inquiry depicted in relation to method step 510 yields a determination that a decision is NOT made based upon the source port field of received packet headers, the process proceeds to method step 514 and continues from that point. In event that the inquiry depicted in method step 510 yields a determination that the Rule Under Consideration does make a decision based upon the source port field of received packet headers, the process proceeds to method step 512 wherein is depicted that a source port compare node, having separate miss and match branches consistent with the source port field of the Rule Under Consideration, is appended to the preceding compare node. Thereafter, the process proceeds to method step 514 wherein is depicted the inquiry as to whether the Rule Under Consideration makes decisions based upon the destination address field of received packet headers. In the event that the inquiry depicted in relation to method step 514 yields a determination that a decision is NOT made based upon the destination address field of received packet headers, the process proceeds to method step 518 and proceeds from that point. In event that the inquiry depicted in method step 514 yields a determination that the Rule Under Consideration does make a decision based upon the destination address field of received packet headers, the process proceeds to method step 516 wherein is depicted that a destination address compare node, having separate miss and match branches consistent with the destination address field of the Rule Under Consideration, is appended to the preceding compare node. Thereafter, the process proceeds to method step 518 wherein is depicted the inquiry as to whether the Rule Under Consideration makes decisions based upon the destination port field of received packet headers. In the event that the inquiry depicted in relation to method step 518 yields a determination that a decision is NOT made based upon the destination port field of received packet headers, the process proceeds to method step 519, which shows the insertion of a stop node having miss and match branches consistent with final dispensation of Rule Under Consideration. Thereafter, the process proceeds to method step 522 and stops. In event that the inquiry depicted in method step 518 yields a determination that the Rule Under Consideration does make a decision based upon the destination port field of received packet headers, the process proceeds to method step 520 wherein is depicted that a destination port compare node, having separate miss and match branches consistent with the destination port field of the Rule Under Consideration, is appended to the preceding compare node. Thereafter, the process proceeds to method step 521, which shows the insertion of a stop node having miss and match branches consistent with final dispensation of Rule Under Consideration. Thereafter, the process proceeds to method step 522 and stops.

For sake of simplicity the process described in relation to FIG. 5 makes reference only to source address, source port, destination address, destination port, and protocol identification fields. However, it is to be understood and will be appreciated by those having skill in the art that many other such fields exist (e.g., IP Quality of Service, TCP Flag fields) which can be utilized to construct binary comparison trees in a fashion substantially analogous to that demonstrated in FIG. 5. The present discussion refers to logical nodes having miss and match branches; in one embodiment such nodes having miss and match branches are implemented as an instruction word to a packet processor containing a compare opcode and operand. Accordingly, FIG. 5, as all figures herein, is intended to be exemplary and not limiting.

Referring now to FIG. 6, illustrated is the process, referenced in method step 412, by which the binary comparison tree constructed for the Rule Under Consideration may be added to a hash table. Method step 600 shows the start of the process. Method step 602 depicts the inquiry as to whether there is a pre-existing binary comparison tree at the hash table index equal to the hash table index value created for the ACL Rule Under Consideration. If the inquiry of method step 602 yields a determination that there is NOT a binary comparison tree at the hash table index equal to the hash-table-index value index created for the ACL Rule Under Consideration, method step 604 illustrates that the binary comparison tree is appended in its entirety at the hash table entry associated with the hash table index, with the leftmost node of the binary comparison tree serving as root of the tree. Thereafter, the process proceeds to method step 606 and stops.

Figure 7D2:
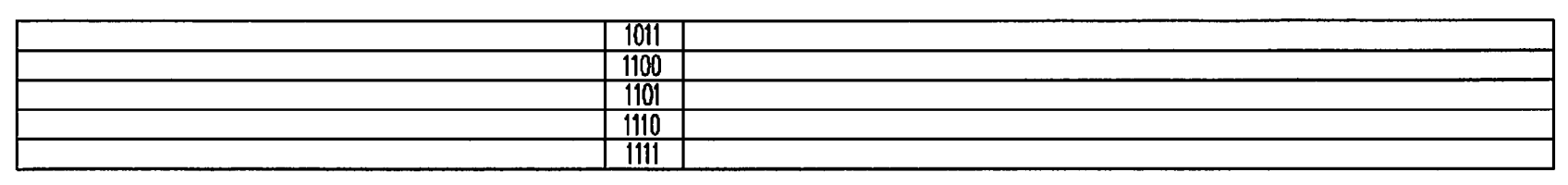

If the inquiry depicted in method step 602 yields a determination that there is a binary comparison tree at the hash index equal to the hash table index value created for the ACL Rule Under Consideration, illustrated is that the process proceeds to method step 608 wherein is shown that New Compare Node Pointer is set to point to the leftmost node of the binary comparison tree for the Rule Under Consideration (e.g., TCP if the Rule Under Consideration is assumed to be the rule constructed for the second rule in the example set forth in FIGS. 7A-7D12, below) and New Compare Node Field Type is set equal to the type of field utilized by the node pointed to by the New Compare Node Pointer (e.g., type of field is "protocol id." if the Rule Under Consideration is assumed to be the second rule in the example set forth in FIGS. 7A-7D12, below). Thereafter, shown in method step 610 is that Old Compare Node Pointer is set to the leftmost node (or root) of the pre-existing binary comparison tree already present at the hash index (e.g., TCP if it is assumed that the pre-existing binary comparison tree is the tree for the first rule constructed, and thereafter appended at index 0000, in the example set forth in FIGS. 7A-7D12, below) and that Old Compare Node Field Type is set equal to the type of field utilized by the node pointed at by the Old Compare Node Pointer (e.g., type of field is "protocol id." if it is assumed that the Pre-Existing binary comparison tree is the tree for the first rule constructed, and thereafter appended at index 0000, in the example set forth in FIGS. 7A-7D12, below).

Thereafter, the process proceeds to method step 612 wherein is depicted the inquiry as to whether New Compare Node Field Type is the same as Old Compare Node Field Type (continuing with the example involving the first rule and second rule, below, both would be of type "protocol id."). If the inquiry depicted in method step 612 yields a determination that New Compare Node Field Type is the same as Old Compare Node Field Type, then the process proceeds to method step 614, wherein is shown the inquiry as to whether the value of the field utilized by the node pointed at by the New Compare Node Pointer is a subset (the term subset here means a further subdivision of an overall network concept associated with the field; for example, "source port>50" would be considered a "subset" of "source port>20") of the value of the field utilized by the node pointed at by the Old Compare Node Pointer. If the inquiry shown in method step 614 yields a determination that the value of the field utilized by the node pointed at by the New Compare Node Pointer is a subset of value of the field utilized by the node pointed at by the Old Compare Node Pointer, then the process proceeds to method step 616, wherein is depicted that a Next New Node Pointer is set to point to the node at the end of the match branch of the node pointed to by the New Compare Node Pointer (i.e., the next node on the match branch of the binary comparison tree for the Rule Under Consideration). Thereafter, method step 618 illustrates that New Compare Node Pointer is reset to be equal to the Next New Node Pointer.

Thereafter, the process proceeds to method step 620, wherein is depicted that Next Old Node Pointer is set to point to the node at the end of the match branch the node pointed to by the Old Compare Node Pointer (i.e., the next node on the match branch of the binary comparison tree for the Pre-Existing tree at hash table index). Thereafter, method step 622 illustrates that Old Compare Node Pointer is reset to be equal to the Next Old Node Pointer. Thereafter, the process proceeds to method step 612 and proceeds from that point.

If the inquiry shown in method step 614 yields a determination that the value of the field utilized by the node pointed at by the New Compare Node Pointer is NOT a subset of value of the field utilized by the node pointed at by the Old Compare Node Pointer, then the process proceeds to method step 624 which shows the inquiry as to whether the value of the node on the miss branch of the node pointed to by Old Compare Node Pointer is a stop node (e.g., no further nodes extend from the node on the miss branch). If the inquiry shown in method step 624 yields a determination that the value of the field utilized by node on the miss branch of the node pointed to by Old Compare Node Pointer equates to a "stop node," method step 626 shows that the node on the miss branch of node pointed to by Old Compare Node Pointer is replaced with the node pointed at by New Compare Node Pointer (i.e. the New Compare Node Value is appended onto the Pre-Existing Binary Compare Tree). Thereafter, method step 628 depicts that a Default Deny Node Value is appended to the miss branch of the node just appended to the pre-existing hash table tree (i.e., the node pointed to by the New Compare Node pointer) as was discussed in relation to method step 626. Subsequently, the process proceeds to method step 630 and stops.

If the inquiry shown in method step 624 yields a determination that the value of the field utilized by node on the miss branch of the node pointed to by Old Compare Node Pointer DOES NOT equate to a "stop node," method step 632 shows that Next Old Node Pointer is set to point to the node at the end of the miss branch of node pointed to by the Old Compare Node Pointer (i.e., the next node on the match branch of the binary comparison tree for the Pre-Existing tree at hash table index). Thereafter, method step 634 illustrates that Old Compare Node Value is reset to be the value of the Next Old Node Pointer. Thereafter, the process proceeds to 624 and proceeds from that point.

If the inquiry depicted in method step 612 yields a determination that New Compare Node Field Type is NOT the same as Old Compare Node Field Type, then the process proceeds to method step 636, which shows that a New Stored Node Pointer is set to be equal to the New Compare Node Pointer. Thereafter, method step 638 depicts that Old Stored Node Pointer is set to be equal to Old Compare Node Pointer. Thereafter, method step 640 illustrates the inquiry as to whether the value of the node on the miss branch of the node pointed to by Old Compare Node equates to a "stop node." If the inquiry illustrated in method step 640 yields a determination that the value of the node on the miss branch of the node pointed to by Old Compare Node equates to a "stop node," the process proceeds to method step 642 which shows the addition of a tree residual, starting from the node of the binary comparison tree for the Rule Under Consideration, pointed at by New Compare Node Pointer, at the end of the miss branch of the Old Compare Node, which is a node in the Hash Table Tree; that is, the node having a value equating to a stop node is replaced with the remainder of the binary tree for the Rule Under Consideration, where the first replacement node utilized is that node pointed at by the New Compare Node Pointer.

Thereafter, the process proceeds to method step 644 which depicts that Next Old Node Pointer is set to point to the node at the end of the match branch of Old Stored Node (we are doing this because if the field type does not match, part of the binary comparison tree created for the Rule Under Consideration must be appended to both the miss and match branch of the pre-existing hash table tree since the ACL Rule(s) encoded by the pre-existing hash table tree do not utilize the field type which is utilized by the binary tree constructed for the current Rule Under Consideration). Thereafter, method step 646 illustrates that Old Compare Node Pointer is reset to equal the Next Old Node Pointer. Thereafter, method step 648 depicts the inquiry as to whether the value of the node pointed at by Old Compare Node Pointer equates to a "stop value" (e.g., default deny, transmit packet, deny packet, etc.). In the event that the inquiry illustrated by method step 648 yields a determination that the value of the node pointed at by Old Compare Node Pointer equates to a stop value, the process proceeds to method step 649 wherein is illustrated the addition of a tree residual, starting from the node of the binary comparison tree for the Rule Under Consideration, pointed at by New Compare Node Pointer, at the end of the match branch of the Old Compare Node, which is a node in the Hash Table Tree; that is, the node having a value equating to a stop node is replaced with the remainder of the binary tree for the Rule Under Consideration, where the first replacement node utilized is that node pointed at by the New Compare Node Pointer. Thereafter, the process proceeds to method step 630 and stops. In the event that the inquiry illustrated by method step 648 yields a determination that the value of the node pointed at by Old Compare Node Pointer does NOT equate to a stop value, the process proceeds to method step 652 wherein is depicted that the New Compare Node Pointer is set to point to the node pointed at by the New Stored Node Pointer—the reason that this pointer is not advanced at this method step is that now the process is going to append at least part of the binary Rule Under Consideration to the match branch of the pre-existing tree where the field types did not match. Thereafter, the process proceeds to method step 612 and continues from that point.

If the inquiry illustrated in method step 640 yields a determination that the node on the miss branch of the node pointed to by the Old Compare Node Pointer does NOT equate to a stop node, the process proceeds to method step 654 which shows that Next Old Node Pointer is set to point to the node at the end of the miss branch of the node pointed to by the Old Compare Node Pointer (i.e., the next node on the match branch of the binary comparison tree for the Pre-Existing tree at hash table index). Thereafter, method step 656 illustrates that the Old Compare Node Pointer is reset to equal the Next Old Node Pointer. Thereafter, the process proceeds to method step 640 and continues from that point.

With reference now to FIGS. 7A-7D12, shown is an example of the creation of a Hash-Table-Balancing Bit Selection Vector, and the subsequent creation of Balanced Hash Table of ABCTs such as were referred to in the flowcharts above. FIG. 7A depicts an obtained hypothetical complete, ordered, ACL (e.g., the ACL referenced in FIGS. 1-6, above). The right-hand column of FIG. 7A contains examples of the coded versions of ACL Rules which are typically utilized within an ACL. The left-hand column gives a plain English explanation of what the rules in the corresponding right hand columns mean.

Referring now to FIG. 7B, depicted is an example of the creation of an exemplar bit string (e.g., such as described in relation to method step 204, above) based upon the fields utilized by the ACL rules illustrated in the right hand column of FIG. 7A, and the subsequent use of the exemplar bit string to construct bit strings for each ACL Rule in the ACL illustrated in the right-hand column of FIG. 7A (e.g., such as described in relation to method step 206, above). Also shown is that, for sake of illustration and ease of counting, the term "bit positions"—as used in the examples of FIGS. 7B-7D12—will include the "periods" shown in the constructed bit strings of FIG. 7B, although those skilled in art will recognize that in practice such periods are not typically counted as bit positions. To reinforce this convention, illustrated immediately below the created bit strings of FIG. 7B is an illustration of the "bit position" within each constructed bit string, as that term is subsequently used in the following FIGS. 7C-7D12.

Referring now to FIG. 7C1-7C5, illustrated is an example of the creation of a Hash-Table-Balancing Bit Selection Vector (e.g., such as that referenced in FIGS. 3A and 3B, above). The right-hand columns of FIGS. 7C1-7C5 depict the actual use and manipulation of quantities utilized and described in relation to FIGS. 3A and 3B above, while the left-hand columns corresponding with (i.e., in the same row as) the right-hand columns describe, in words, what is transpiring in the right-hand column. The example ends with specification of the Hash-Table-Balancing Bit Selection Vector.

With reference now to FIGS. 7D1-7D12, shown is an example of the creation of a Balanced Hash Table of ABCTs, such as was referenced in relation to FIG. 1A. FIG. 7D1 depicts the creation (e.g., such as that described in relation to FIG. 5, above) of a Binary Comparison Rule for the first-in-sequence rule within the ACL depicted in FIG. 7A. FIGS. 7D1-7D2 illustrate the addition of the binary comparison tree created for the first-in-sequence rule to a hash table at the index position dictated by the Hash-Table-Balancing Bit Selection Vector.

FIG. 7D3 depicts the creation (e.g., such as that described in relation to FIG. 5, above) of a Binary Comparison Rule for the second-in-sequence rule within the ACL depicted in FIG. 7A. FIGS. 7D3-7D4 illustrate the addition of the binary comparison tree created for the second-in-sequence rule to a hash table at the index position dictated by the Hash-Table-Balancing Bit Selection Vector.

FIG. 7D5 depicts the creation (e.g., such as that described in relation to FIG. 5, above) of a Binary Comparison Rule for the third-in-sequence rule within the ACL depicted in FIG. 7A. FIGS. 7D5-7D6 illustrate the addition of the binary comparison tree created for the third-in-sequence rule to a hash table at the index position dictated by the Hash-Table-Balancing Bit Selection Vector.

Figure 7D4:
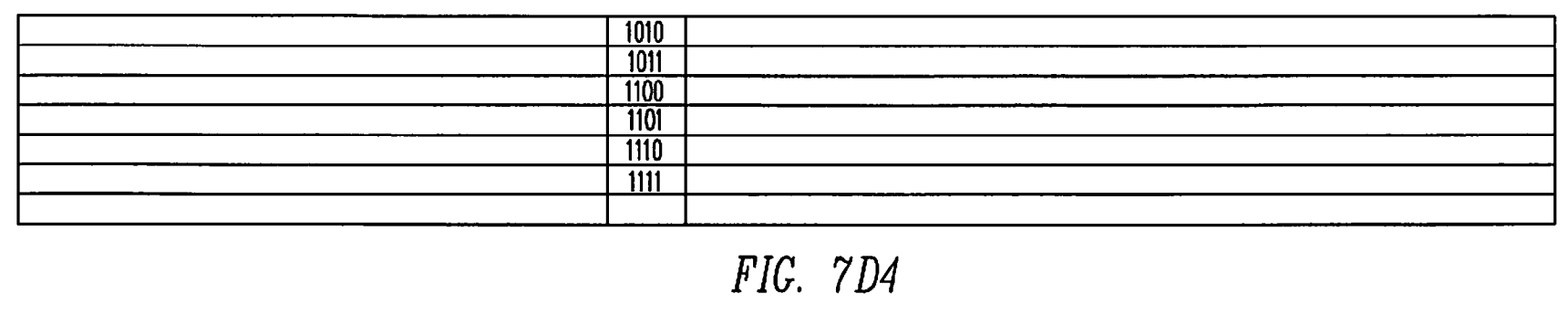

FIG. 7D7 depicts the creation (e.g., such as that described in relation to FIG. 5, above) of a Binary Comparison Rule for the fourth-in-sequence rule within the ACL depicted in FIG. 7A. FIGS. 7D7-7D8 illustrate the addition of the binary comparison tree created for the fourth-in-sequence rule to a hash table at the index position dictated by the Hash-Table-Balancing Bit Selection Vector.

FIG. 7D9 depicts the creation (e.g., such as that described in relation to FIG. 5, above) of a Binary Comparison Rule for the fifth-in-sequence rule within the ACL depicted in FIG. 7A. FIGS. 7D9-7D10 illustrate the addition of the binary comparison tree created for the fifth-in-sequence rule to a hash table at the index position dictated by the Hash-Table-Balancing Bit Selection Vector.

FIG. 7D11 depicts the creation (e.g., such as that described in relation to FIG. 5, above) of a Binary Comparison Rule for the sixth-in-sequence rule within the ACL depicted in FIG. 7A. FIGS. 7D11-7D12 illustrate the addition of the binary comparison tree created for the sixth-in-sequence rule to a hash table at the index position dictated by the Hash-Table-Balancing Bit Selection Vector.

The foregoing detailed description has set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using TDM or IP based communication links (e.g., packet links).

A more-preferred embodiment is set forth in the body of the present patent application. As noted above, the more-preferred embodiment may be implemented by virtually any combination of hardware, software, and/or firmware. A less-preferred embodiment is set forth in the accompanying appendix. The hardware and software aspects of this less-preferred embodiment are merely exemplary, and those skilled in the art will recognize that the less-preferred embodiment can itself be implemented by virtually any combination of hardware, software, and/or firmware. The less-preferred embodiment is in no way intended to limit or apply to the more-preferred embodiment.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements.

The invention claimed is:

1. A method comprising:
   receiving at least one packet;
   accessing a Hash Table, based upon information included in the at least one packet, wherein
   the Hash Table is balanced,
   the Hash Table stores Binary Comparison Trees, and
   the Hash Table encodes an Access Control List; and
   disposing of the at least one packet, based upon the Access Control list encoded in the Hash Table.

2. The method of claim 1, wherein said disposing of the received at least one packet further includes:
   constructing a hash table index value from one or more bit positions, within the received at least one packet, pointed at by one or more pointers of a Hash-Table-Balancing Bit Selection Vector; and
   walking a binary comparison tree, stored within the Hash Table, associated with the constructed hash table index value.

3. The method of claim 1, further comprising:
   converting the Access Control List to the Hash Table.

4. The method of claim 3, wherein said converting the Access Control List to the Hash Table further includes:
creating a binary comparison tree for at least one Access Control List rule in the Access Control List.

5. The method of claim 4, wherein said creating a binary comparison tree for at least one Access Control List rule further includes:
creating at least one node, having at least one miss branch and at least one match branch, for at least one packet header field utilized by the at least one Access Control List Rule in the Access Control List.

6. The method of claim 3, wherein said converting the Access Control List to the Hash Table further includes:
inserting at least a part of a binary comparison tree constructed for at least one Access Control List rule into a hash table entry pointed at by a hash table index.

7. The method of claim 6, wherein said inserting at least a part of a binary comparison tree constructed for at least one Access Control List rule into a hash table entry pointed at by a hash table index further includes:
generating a hash table index value for the at least one Access Control List rule; and
inserting the at least a part of a binary comparison tree constructed for at least one Access Control List rule into a hash table entry pointed at by a hash table index which is equal to the generated hash table index value.

8. The method of claim 7, wherein said inserting the at least a part of a binary comparison tree constructed for at least one Access Control List rule into a hash table entry pointed at by a hash table index which is equal to the generated hash table index value further includes:
inserting, in its entirety, the binary comparison tree constructed for the at least one Access Control List rule into the hash table entry pointed at by the hash table index in response to a determination that no pre-existing binary comparison tree is resident within the hash table entry.

9. The method of claim 7, wherein said inserting the at least a part of a binary comparison tree constructed for at least one Access Control List rule into a hash table entry pointed at by a hash table index which is equal to the generated hash table index value further includes:
inserting at least one node of the binary comparison tree constructed for the at least one Access Control List rule into the hash table entry pointed at by the hash table index in response to a determination that a pre-existing binary comparison tree is resident within the hash table entry.

10. The method of claim 7, wherein said generating a hash table index value for the at least one Access Control List rule further includes:
constructing the hash table index value from the contents of one or more packet headers utilized by the at least one Access Control List rule in the Access Control List.

11. The method of claim 10, wherein said constructing the hash table index value from the contents of one or more packet headers utilized by the at least one Access Control List rule in the Access Control List further includes:
constructing the hash table index value from the contents of the one or more packet header bit positions pointed at by one or more pointers of a Hash-Table-Balancing Bit Selection Vector.

12. The method of claim 11, wherein said constructing the hash table index value from the contents of the one or more packet header bit positions pointed at by one or more pointers of a Hash-Table-Balancing Bit Selection Vector further includes:
constructing the Hash-Table-Balancing Bit Selection Vector.

13. The method of claim 12, wherein said constructing the Hash-Table-Balancing Bit Selection Vector further includes:
defining one or more pointers of the Hash-Table-Balancing Bit Selection Vector to point to one or more bit positions in one or more packet header fields utilized by one or more rules of the Access Control List.

14. The method of claim 13, wherein said defining one or more pointers of the Hash-Table-Balancing Bit Selection Vector to point to one or more bit positions in one or more packet header fields utilized by one or more rules of the Access Control List further includes:
defining the one or more pointers of the Hash-Table-Balancing Bit Selection Vector to point to one or more bit positions, which appear relatively most frequently, within the one or more packet header fields utilized by the one or more Rules of the Access Control List.

15. The method of claim 13, wherein said defining one or more pointers of the Hash-Table-Balancing Bit Selection Vector to point to one or more bit positions in one or more packet header fields utilized by one or more rules of the Access Control List further includes:
defining the one or more pointers of the Hash-Table-Balancing Bit Selection Vector to point to one or more bit positions, whose contents have relatively equal variation between logical one and logical zero, within the one or more packet header fields utilized by the one or more Rules of the Access Control List.

16. A system comprising:
a Hash Table;
means for receiving at least one packet; and
means for disposing of the received at least one packet, based upon an Access Control list encoded in the Hash Table, wherein the means for disposing of the at least one packet are configured to access the Hash Table, based upon information included in the at least one packet, and wherein
the Hash Table is balanced,
the Hash Table stores Binary Comparison Trees, and
the Hash Table encodes the Access Control List.

17. The system of claim 16, wherein said means for disposing of the received at least one packet further includes:
means for constructing a hash table index value from one or more bit positions, within the received at least one packet, pointed at by one or more pointers of a Hash-Table-Balancing Bit Selection Vector; and
means for walking a binary comparison tree associated with the constructed hash table index value.

18. The system of claim 16, further comprising:
means for converting the Access Control List to the Hash Table.

19. The system of claim 18, wherein said means for converting the Access Control List to the Hash Table further includes:
means for creating a binary comparison tree for at least one Access Control List rule in the Access Control List.

20. The system of claim 19, wherein said means for creating a binary comparison tree for at least one Access Control List rule further includes:
means for creating at least one node, having at least one miss branch and at least one match branch, for at least one packet header field utilized by the at least one Access Control List rule in the Access Control List.

21. The system of claim 18, wherein said means for converting the Access Control List to the Hash Table further includes:
   means for inserting at least a part of a binary comparison tree constructed for at least one Access Control List rule into a hash table entry pointed at by a hash table index.

22. The system of claim 21, wherein said means for inserting at least a part of a binary comparison tree constructed for at least one Access Control List rule into a hash table entry pointed at by a hash table index further includes:
   means for generating a hash table index value for the at least one Access Control List rule; and
   means for inserting the at least a part of a binary comparison tree constructed for at least one Access Control List rule into a hash table entry pointed at by a hash table index which is equal to the generated hash table index value.

23. The system of claim 22, wherein said means for inserting the at least a part of a binary comparison tree constructed for at least one Access Control List rule into a hash table entry pointed at by a hash table index which is equal to the generated hash table index value further includes:
   means for inserting, in its entirety, the binary comparison tree constructed for the at least one Access Control List Rule into the hash table entry pointed at by the hash table index in response to a determination that no pre-existing binary comparison tree is resident within the hash table entry.

24. The system of claim 22, wherein said means for inserting the at least a part of a binary comparison tree constructed for at least one Access Control List rule into a hash table entry pointed at by a hash table index which is equal to the generated hash table index value further includes:
   means for inserting at least one node of the binary comparison tree constructed for the at least one Access Control List rule into the hash table entry pointed at by the hash table index in response to a determination that a pre-existing binary comparison tree is resident within the hash table entry.

25. The system of claim 22, wherein said means for generating a hash table index value for the at least one Access Control List rule further includes:
   means for constructing the hash table index value from the contents of one or more packet headers utilized by the at least one Access Control List rule in the Access Control List.

26. The system of claim 25, wherein said means for constructing the hash table index value from the contents of one or more packet headers utilized by the at least one Access Control List rule in the Access Control List further includes:
   means for constructing the hash table index value from the contents of the one or more packet header bit positions pointed at by one or more pointers of a Hash-Table-Balancing Bit Selection Vector.

27. The system of claim 26, wherein said means for constructing the hash table index value from the contents of the one or more packet header bit positions pointed at by one or more pointers of a Hash-Table-Balancing Bit Selection Vector further includes:
   means for constructing the Hash-Table-Balancing Bit Selection Vector.

28. The system of claim 27, wherein said means for constructing the Hash-Table-Balancing Bit Selection Vector further includes:
   means for defining one or more pointers of the Hash-Table-Balancing Bit Selection Vector to point to one or more bit positions in one or more packet header fields utilized by one or more rules of the Access Control List.

29. The system of claim 28, wherein said means for defining one or more pointers of the Hash-Table-Balancing Bit Selection Vector to point to one or more bit positions in one or more packet header fields utilized by one or more rules of the Access Control List further includes:
   means for defining the one or more pointers of the Hash-Table-Balancing Bit Selection Vector to point to one or more bit positions, which appear relatively most frequently, within the one or more packet header fields utilized by the one or more Rules of the Access Control List.

30. The system of claim 29, wherein said means for defining one or more pointers of the Hash-Table-Balancing Bit Selection Vector to point to one or more bit positions in one or more packet header fields utilized by one or more rules of the Access Control List further includes:
   means for defining the one or more pointers of the Hash-Table-Balancing Bit Selection Vector to point to one or more bit positions, whose contents have relatively equal variation between logical one and logical zero, within the one or more packet header fields utilized by the one or more Rules of the Access Control List.

31. The system of claim 16, further comprising:
   signal bearing media bearing
      said means for receiving at least one packet, and
      said means for disposing of the received at least one packet in response to a walk of the Hash Table.

32. The system of claim 31, wherein said signal bearing media further includes:
   recordable media.

33. The system of claim 31, wherein said signal bearing media further includes:
   transmission media.

34. The system of claim 16, wherein the system further includes:
   a network station.

35. A program product comprising:
   a computer readable storage medium comprising a Hash Table and program instructions executable to:
      receiving receive at least one packet;
      access the Hash Table, based upon information included in the at least one packet, wherein
         the Hash Table is balanced,
         the Hash Table stores Binary Comparison Trees, and
         the Hash Table encodes an Access Control List; and
      dispose of the at least one packet, based upon the Access Control list encoded in the Hash Table.

36. The program product of claim 35, wherein said signal bearing media further includes:
   recordable media.

37. The program product of claim 35, wherein the program instructions are executable to:
   construct a hash table index value from one or more bit positions, within the received at least one packet, pointed at by one or more pointers of a Hash-Table-Balancing Bit Selection Vector; and
   walk binary comparison tree associated with the constructed hash table index value.

38. The program product of claim 35, wherein the program instructions are executable to:
    convert the Access Control List to the Hash Table.

39. The program product of claim 38, wherein the program instructions are executable to:
    create a binary comparison tree for at least one Access Control List rule in the Access Control List.

40. The program product of claim 39, wherein the program instructions are executable to:
    create at least one node, having at least one miss branch and at least one match branch, for at least one packet header field utilized by the at least one Access Control List rule in the Access Control List.

41. The program product of claim 38, wherein the program instructions are executable to:
    insert at least a part of a binary comparison tree constructed for at least one Access Control List rule into a hash table entry pointed at by a hash table index.

42. The program product of claim 41, wherein the program instructions are executable to:
    generate a hash table index value for the at least one Access Control List rule; and
    insert the at least a part of a binary comparison tree constructed for at least one Access Control List rule into a hash table entry pointed at by a hash table index which is equal to the generated hash table index value.

43. The program product of claim 42, wherein the program instructions are executable to:
    insert, in its entirety, the binary comparison tree constructed for the at least one Access Control List Rule into the hash table entry pointed at by the hash table index in response to a determination that no pre-existing binary comparison tree is resident within the hash table entry.

44. The program product of claim 42, wherein the program instructions are executable to:
    insert at least one node of the binary comparison tree constructed for the at least one Access Control List rule into the hash table entry pointed at by the hash table index in response to a determination that a pre-existing binary comparison tree is resident within the hash table entry.

45. The program product of claim 42, wherein the program instructions are executable to:
    construct the hash table index value from the contents of one or more packet headers utilized by the at least one Access Control List rule in the Access Control List.

46. The program product of claim 45, wherein the program instructions are executable to:
    construct the hash table index value from the contents of the one or more packet header bit positions pointed at by one or more pointers of a Hash-Table-Balancing Bit Selection Vector.

47. The program product of claim 46, wherein the program instructions are executable to:
    construct the Hash-Table-Balancing Bit Selection Vector.

48. The program product of claim 47, wherein the program instructions are executable to:
    define one or more pointers of the Hash-Table-Balancing Bit Selection Vector to point to one or more bit positions in one or more packet header fields utilized by one or more rules of the Access Control List.

49. The program product of claim 48, wherein the program instructions are executable to:
    define the one or more pointers of the Hash-Table-Balancing Bit Selection Vector to point to one or more bit positions, which appear relatively most frequently, within the one or more packet header fields utilized by the one or more Rules of the Access Control List.

50. The program product of claim 49, wherein the program instructions are executable to:
    define the one or more pointers of the Hash-Table-Balancing Bit Selection Vector to point to one or more bit positions, whose contents have relatively equal variation between logical one and logical zero, within the one or more packet header fields utilized by the one or more Rules of the Access Control List.

51. A network station comprising:
    a hash table, wherein
        the hash table is balanced,
        the hash table stores binary comparison trees, and
        the hash table encodes an access control list;
    an interface configured to receive a packet; and
    a per-packet processing engine coupled to the hash table and configured to access the hash table, based upon information included in the packet received by the interface, wherein the per-packet processing engine is configured to dispose of the at least one packet, based upon the Access Control list encoded in the Hash Table.

52. The network station of claim 51, wherein the per-packet processing engine is configured to:
    construct a hash table index value from one or more bit positions, within the packet, pointed at by one or more pointers of a hash-table-balancing bit selection vector; and
    walk a binary comparison tree, stored in the hash table, associated with the constructed hash table index value.

53. The network station of claim 51, further comprising:
    program instructions executable by the network station to convert the access control list to the hash table.

54. The network station of claim 53, wherein the program instructions are is further executable by the network station to:
    create a binary comparison tree for at least one access control List rule in the Access Control List.

55. The network station of claim 53, wherein the program instructions are further executable by the network station to:
    insert at least a part of a binary comparison tree constructed for at least one access control list rule into a hash table entry pointed at by a hash table index.

56. The network station of claim 55, wherein the program instructions are further executable by the network station to:
    generate a hash table index value for the at least one access control list rule; and
    insert the at least a part of a binary comparison tree constructed for at least one access control list rule into a hash table entry pointed at by a hash table index which is equal to the generated hash table index value.

57. The network station of claim 56, wherein the program instructions are further executable by the network station to:
    insert, in its entirety, the binary comparison tree constructed for the at least one access control list rule into the hash table entry pointed at by the hash table index in response to a determination that no pre-existing binary comparison tree is resident within the hash table entry.

58. The network station of claim 56, wherein the program instructions are further executable by the network station to:
    insert at least one node of the binary comparison tree constructed for the at least one access control list rule into the hash table entry pointed at by the hash table index in response to a determination that a pre-existing binary comparison tree is resident within the hash table entry.

59. The network station of claim 56, wherein the program instructions are further executable by the network station to:
construct the hash table index value from the contents of one or more packet headers utilized by the at least one access control list rule in the access control list.

60. The network station of claim 59, wherein the program instructions are further executable by the network station to:
construct the hash table index value from the contents of the one or more packet header bit positions pointed at by one or more pointers of a hash-table-balancing bit selection vector.

61. The network station of claim 60, wherein the program instructions are further executable by the network station to:
define one or more pointers of the hash-table-balancing bit selection vector to point to one or more bit positions in one or more packet header fields utilized by one or more rules of the access control list.

62. The network station of claim 61, wherein the program instructions are further executable by the network station to:
define the one or more pointers of the hash-table-balancing bit selection vector to point to one or more bit positions, which appear relatively most frequently, within the one or more packet header fields utilized by the one or more rules of the access control list.

63. The network station of claim 61, wherein the program instructions are further executable by the network station to:
define the one or more pointers of the hash-table-balancing bit selection vector to point to one or more bit positions, whose contents have relatively equal variation between logical one and logical zero, within the one or more packet header fields utilized by the one or more rules of the access control list.

* * * * *